United States Patent [19]

Kupiec

[11] Patent Number: 5,500,920
[45] Date of Patent: Mar. 19, 1996

[54] SEMANTIC CO-OCCURRENCE FILTERING FOR SPEECH RECOGNITION AND SIGNAL TRANSCRIPTION APPLICATIONS

[75] Inventor: Julian M. Kupiec, Cupertino, Calif.

[73] Assignee: Xerox Corporation, Stamford, Conn.

[21] Appl. No.: 316,619

[22] Filed: Sep. 30, 1994

Related U.S. Application Data

[63] Continuation of Ser. No. 126,170, Sep. 23, 1993, abandoned.

[51] Int. Cl.$^6$ ........................................... G10L 9/00
[52] U.S. Cl. ..................... 395/2.79; 395/2.84; 395/2.86; 364/419.07
[58] Field of Search .................... 395/2.44, 2.69, 395/2.79, 2.84, 2.86; 381/43, 44, 52; 364/419.03, 419.08, 419.07, 419.13

[56] References Cited

U.S. PATENT DOCUMENTS

| | | | |
|---|---|---|---|
| 2,921,133 | 1/1960 | Kalfaian | 178/31 |
| 3,158,685 | 11/1964 | Gerstman et al. | 395/2.69 |
| 3,996,569 | 12/1976 | Saunders | 365/189.07 |
| 4,270,182 | 5/1981 | Asija | 364/419.2 |
| 4,674,066 | 6/1987 | Kucera | 395/600 |
| 4,823,306 | 4/1989 | Barbic et al. | 395/600 |
| 4,931,935 | 6/1990 | Ohira et al. | 364/419.08 |
| 4,994,967 | 2/1991 | Asakawa | 364/419.08 |
| 5,062,074 | 10/1991 | Kleinberger | 395/600 |
| 5,063,508 | 11/1991 | Yamada et al. | 364/419.03 |
| 5,278,918 | 1/1994 | Bernzott et al. | 364/419.08 |
| 5,278,980 | 1/1994 | Pedersen et al. | 395/600 |
| 5,390,281 | 2/1995 | Luciw et al. | 364/419.08 |
| 5,406,480 | 4/1995 | Kanno | 364/419.08 |

FOREIGN PATENT DOCUMENTS

| | | | |
|---|---|---|---|
| 0157539 | 10/1985 | European Pat. Off. | G06F 15/40 |
| 0304191 | 2/1989 | European Pat. Off. | G06F 15/40 |
| 0425291A2 | 2/1991 | European Pat. Off. | |

OTHER PUBLICATIONS

Webster's II New Riverside University Dictionary, 1988, p. 1226.

"Text Search and Retrieval Reference Manual for the Automated Patent System," U.S. Patent & Trademark Office, Oct. 21, 1992.

Communication: European Search Report for D/93184 dated 11 Jan. 1995.

Cutting et al., "An Object–Oriented Architecture for Text Retrieval," in Intelligent Text and Image Handling, Proceedings of a Conference on Intelligent Text and Image Handling 'RIAO 91,' Barcelona, Spain Apr. 2–5, 1991 (A. Lichnerowicz, ed.), pp. 285–298.

Glavitsch et al., "A System for Retrieving Speech Documents," 15th Ann. Int'l. SIGIR '92/Denmark–Jun. 1992, pp. 168–176.

(List continued on next page.)

*Primary Examiner*—David D. Knepper
*Assistant Examiner*—Michael A. Sartori
*Attorney, Agent, or Firm*—Alexander E. Silverman

[57] ABSTRACT

A system and method for automatically transcribing an input question from a form convenient for user input into a form suitable for use by a computer. The question is a sequence of words represented in a form convenient for the user, such as a spoken utterance or a handwritten phrase. The question is transduced into a signal that is converted into a sequence of symbols. A set of hypotheses is generated from the sequence of symbols. The hypotheses are sequences of words represented in a form suitable for use by the computer, such as text. One or more information retrieval queries are constructed and executed to retrieve documents from a corpus (database). Retrieved documents are analyzed to produce an evaluation of the hypotheses of the set and to select one or more preferred hypotheses from the set. The preferred hypotheses are output to a display, speech synthesizer, or applications program. Additionally, retrieved documents relevant to the preferred hypotheses can be selected and output.

22 Claims, 11 Drawing Sheets

OTHER PUBLICATIONS

Harris, Mary Dee Harris "Introduction to Natural Language Processing," pp. 102–114 (Reston Publishing Company, Inc., Reston, VA), 1985.

Hopcroft et al., "Introduction to Automata Theory, Languages, and Computation," pp. 13–76 (Copyright © 1979 by Addison–Wesley Publishing Company, Reading, MA).

Lamel et al., "Speech Database Development: Design and Analysis of the Acoustic–Phonetic Corpus," pp. 100–109 (Proceedings of the Speech Recognition Workshop held in Palo Alto, CA, Feb. 19–20, 1986).

Lucchesi et al., "Applications of Finite Automata Representing Large Vocabularies," *Software–Practice and Experience*, 23(1):15–30, Jan. 1993 (see especially pp. 26–27).

Niimi et al., "An Information Retrieval System With a Speech Interface," 1992 Int'l. Conf. on Spoken Language Processing (eds. John J. Ohala, Terrance Nearey, Bruce Denning, Megan Hodge, Grace Wiebe), held in Banff, Alberta, Canada, Oct. 12–16, 1992 (pp. 1407–1410).

Rabiner, Lawrence R., "A Tutorial on Hidden Markov Models and Selected Applications in Speech Recognition," *Proceedings of the IEEE*, 77(2):257–285, Feb. 1989.

Salton et al., "Extended Boolean Information Retrieval," Communications of the ACM, 26(12):1022–1036 (Dec. 1983).

| | |
|---|---|
| ("kendall" | #( sil2-k eh n2 sil2-d l2)) |
| ("kendo" | #( sil2-k eh n2 sil2-d ao2)) |
| ("kendrew" | #( sil2-k eh n2 sil2-d r uw2)) |
| ("kenilworth" | #( sil2-k eh n2 l2 w er2 r th)) |
| ("kenmore" | #( sil2-k eh n2 m2 ow r)) |
| ("kennan" | #( sil2-k eh n2 ah2 n2)) |
| ("kennebec" | #( sil2-k eh n2 ah2 sil2-b eh sil2-k)) |
| ("kennebunk" | #( sil2-k eh n2 ah2 sil2-b ah2 ng2 sil2-k)) |
| ("kennedy" | #( sil2-k eh n2 ih2 sil2-d iy)) |
| ("kennel" | #( sil2-k eh n2 l2)) |
| ("kenner" | #( sil2-k eh n2 ah2 r)) |
| ("kenneth" | #( sil2-k eh n2 ih2 th)) |
| ("kennett" | #( sil2-k eh n2 ih2 sil2-t)) |
| ("kennewick" | #( sil2-k eh n2 ah2 w ih2 sil2-k)) |
| ("kenny" | #( sil2-k eh n2 iy)) |
| ("kenosha" | #( sil2-k ih2 n2 ow sh2 ah2)) |
| ("kenosis" | #( sil2-k ih2 n2 ow s ih2 s)) |
| ("kensington" | #( sil2-k eh n2 z ih2 ng2 sil2-t ah2 n2)) |
| ("kent" | #( sil2-k eh n2 sil2-t)) |
| ("kentish" | #( sil2-k eh n2 sil2-t ih2 sh2)) |
| ("kenton" | #( sil2-k eh n2 sil2-t n2)) |
| ("kentucky" | #( sil2-k ah2 n2 sil2-t ah2 sil2-k iy)) |
| ("kenya" | #( sil2-k eh n2 y ah2)) |
| ("kenyan" | #( sil2-k eh n2 y ah2 n2)) |
| ("kenyatta" | #( sil2-k eh n2 y ao2 sil2-t ah2)) |
| ("kenyon" | #( sil2-k eh n2 y ah2 n2)) |

FIG. 4

SEMANTIC CO-OCCURRENCE FILTERING FOR SPEECH RECOGNITION AND SIGNAL TRANSCRIPTION APPLICATIONS

This is a continuation of application Ser. No. 08/126,170, filed Sep. 23, 1993, now abandoned.

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the patent and trademark office patent file or records, but otherwise reserve all copyright rights whatsoever.

SOFTWARE APPENDIX

An appendix comprising 71 pages is included as part of this application. The appendix provides two (2) files of a source code software program for implementation of an embodiment of the method of the invention on a digital computer.

The files reproduced in the appendix represent unpublished work that is Copyright ©1993 Xerox Corporation. All rights reserved. Copyright protection claimed includes all forms and matters of copyrightable material and information now allowed by statutory or judicial law or hereafter granted, including without limitation, material generated from the software programs which are displayed on the screen such as icons, screen display looks, etc.

BACKGROUND OF THE INVENTION

The present invention relates to systems and methods for transcribing words from a form convenient for input by a human user, e.g., spoken or handwritten words, into a form easily understood by an applications program executed by a computer, e.g., text. In particular, it relates to transcription systems and methods appropriate for use in conjunction with computerized information-retrieval (IR) systems and methods, and more particularly to speech-recognition systems and methods appropriate for use in conjunction with computerized information-retrieval systems and methods used with textual databases.

In prior art IR systems, the user typically enters input—either natural-language questions, or search terms connected by specialized database commands—by typing at a keyboard. Few IR systems permit the user to use speech input, that is, to speak questions or search strings into a microphone or other audio transducer. Systems that do accept speech input do not directly use the information in a database of free-text natural-language documents to facilitate recognition of the user's input speech.

The general problem of disambiguating the words contained in an error-prone transcription of user input arises in a number of contexts beyond speech recognition, including but not limited to handwriting recognition in pen-based computers and personal digital assistants (e.g., the Apple Newton) and optical character recognition. Transcription of user input from a form convenient to the user into a form convenient for use by the computer has any number of applications, including but not limited to word processing programs, document analysis programs, and, as already stated, information retrieval programs. Unfortunately, computerized transcription tends to be error-prone.

SUMMARY OF THE INVENTION

The present invention provides a technique for using information retrieved from a text corpus to automatically disambiguate an error-prone transcription, and more particularly provides a technique for using co-occurrence information in the corpus to disambiguate such input. According to the invention, a processor accepts an input question. The processor is used to generate a hypothesis, typically as to a first word and a second word in the input question, and then is used to gather confirming evidence for the hypothesis by seeking a co-occurrence of the first word and the second word in a corpus.

In one aspect, the present invention provides a system and method for automatically transcribing an input question from a form convenient for user input into a form suitable for use by a computer. The question is a sequence of words represented in a form convenient for the user, such as a spoken utterance or a handwritten phrase. The question is transduced into a signal that is converted into a sequence of symbols. A set of hypotheses is generated from the sequence of symbols. The hypotheses are sequences of words represented in a form suitable for use by the computer, such as text. One or more information retrieval queries are constructed and executed to retrieve documents from a corpus (database). Retrieved documents are analyzed to produce an evaluation of the hypotheses of the set and to select one or more preferred hypotheses from the set. The preferred hypotheses are output to a display, speech synthesizer, or applications program. Additionally, retrieved documents relevant to the preferred hypotheses can be selected and output.

In another aspect, the invention provides a system and method for retrieving information from a corpus of natural-language text in response to a question or utterance spoken by a user. The invention uses information retrieved from the corpus to help it properly interpret the user's question, as well as to respond to the question.

The invention takes advantage of the observation that the intended words in a user's question usually are semantically related to each other and thus are likely to co-occur in a corpus within relatively close proximity of each other. By contrast, words in the corpus that spuriously match incorrect phonetic transcriptions are much less likely to be semantically related to each other and thus less likely to co-occur within close proximity of each other. The invention retrieves from the corpus those segments of text or documents that are most relevant to the user's question by hypothesizing what words the user has spoken based on a somewhat unreliable, error-prone phonetic transcription of the user's spoken utterance, and then searching for co-occurrences of these hypothesized words in documents of the corpus by executing Boolean queries with proximity and order constraints. Hypotheses that are confirmed by query matching are considered to be preferred interpretations of the words of the user's question, and the documents in which they are found are considered to be of probable relevance to the user's question.

A further understanding of the nature and advantages of the invention will become apparent by reference to the remaining portions of the specification and drawings.

BRIEF DESCRIPTION OF THE DRAWINGS

FIG. 4 illustrates a conceptual model of a portion of a phonetic index;

DESCRIPTION OF SPECIFIC EMBODIMENTS

Figure 1:
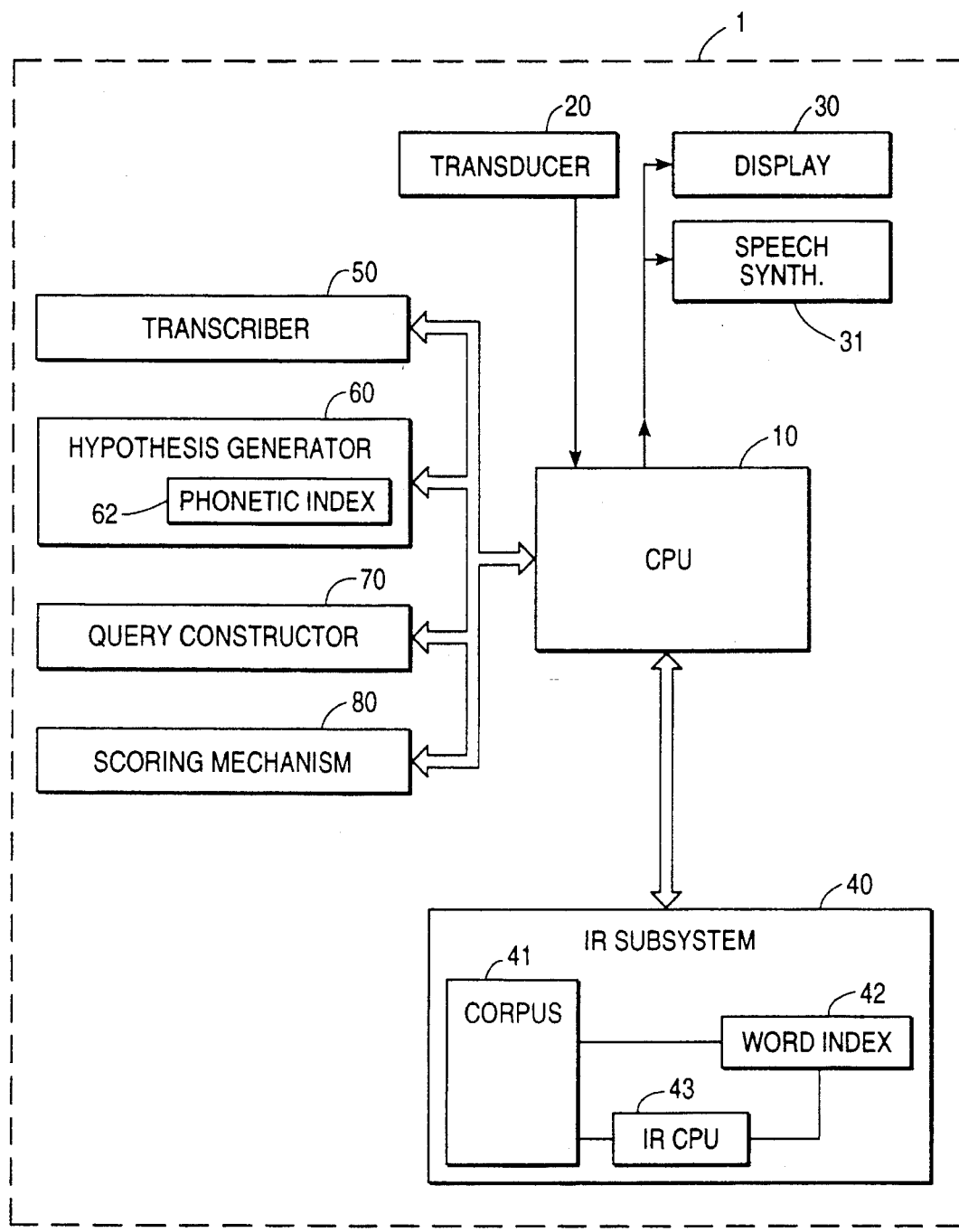
FIG. 1 illustrates a system that embodies the invention.

The disclosures in this application of all articles and references, including patent documents, are incorporated herein by reference.

1. Introduction

The invention will be described in sections 1 through 6 with respect to embodiments that accept user input in the form of spoken words and that are used in information retrieval (IR) contexts. In these embodiments, the invention enables a person to use spoken input to access information in a corpus of natural-language text, such as contained in a typical IR system. The user is presented with information (e.g., document titles, position in the corpus, words in documents) relevant to the input question. Some of these embodiments can incorporate relevance feedback.

The invention uses information, particularly co-occurrence information, present in the corpus to help it recognize what the user has said. The invention provides robust performance in that it can retrieve relevant information from the corpus even if it does not recognize every word of the user's utterance or is uncertain about some or all of the words.

A simple example illustrates these ideas. Suppose that the corpus comprises a database of general-knowledge articles, such as the articles of an encyclopedia, and that the user is interested in learning about President Kennedy. The user speaks the utterance, "President Kennedy," which is input into the invention. The invention needs to recognize what was said and to retrieve appropriate documents, that is, documents having to do with President Kennedy. Suppose further that it is unclear whether the user has said "president" or "present" and also whether the user has said "Kennedy" or "Canada." The invention performs one or more searches in the corpus to try to confirm each of the following hypotheses, and at the same time, to try to gather documents that are relevant to each hypothesis:

| | |
|---|---|
| president | kennedy |
| present | kennedy |
| president | canada |
| present | canada |

The corpus is likely to include numerous articles that contain phrases such as "President Kennedy," "President John F. Kennedy," and the like. Perhaps it also includes an article on "present-day Canada," and an article that contains the phrase "Kennedy was present at the talks . . . ." It does not include any article that contains the phrase "president of Canada" (because Canada has a prime minister, not a president).

The invention assumes that semantically related words in the speaker's utterance will tend to appear together (co-occur) more frequently in the corpus. Put another way, the invention assumes that the user has spoken sense rather than nonsense, and that the sense of the user's words is reflected in the words of articles of the corpus. Thus the fact that "President Kennedy" and related phrases appear in the corpus much more frequently than phrases based on any of the other three hypotheses suggests that "President Kennedy" is the best interpretation of the user's utterance and that the articles that will most interest the user are those that contain this phrase and related phrases. Accordingly, the invention assigns a high score to the articles about President Kennedy and assigns lower scores to the article about present-day Canada and the article about Kennedy's presence at the talks. The highest-scoring articles can be presented to the user as a visual display on a computer screen, as phrases spoken by a speech synthesizer, or both. Optionally, the user can make additional utterances directing the invention to retrieve additional documents, narrow the scope of the displayed documents, and so forth, for example, "Tell me more about President Kennedy and the Warren Commission."

The present invention finds application in information retrieval systems with databases comprising free (unpreprocessed) natural-language text. It can be used both in systems that recognize discrete spoken words and in systems that recognize continuous speech. It can be used in systems that accommodate natural-language utterances, Boolean/proximity queries, special commands, or any combination of these.

More generally, the invention finds application in speech-recognition systems regardless of what they are connected to. A speech recognizer that embodies or incorporates the method of the invention with an appropriate corpus or corpora can be used as a "front end" to any application program where speech recognition is desired, such as, for example, a word-processing program. In this context, the invention helps the application program "make more sense" of what the user is saying and therefore make fewer speech-recognition mistakes than it would otherwise. This is discussed further in section 7 below.

Still more generally, the invention finds application beyond speech-recognition in handwriting recognition, optical character recognition, and other systems in which a user wishes to input words into a computer program in a form that is convenient for the user but easily misinterpreted by the computer. This is discussed further in Section 8 below. The technique of the present invention, in which a sequence of words supplied by a user and transcribed by machine in an error-prone fashion is disambiguated and/or verified by automatically formulating alternative hypotheses about the correct or best interpretation, gathering confirming evidence for these hypotheses by searching a text corpus for occurrences and co-occurrences of hypothesized words, and analyzing the search results to evaluate which hypothesis or hypotheses best represents the user's intended meaning, is referred to as semantic co-occurrence filtering.

2. Glossary

The following terms are intended to have the following general meanings:

Corpus: A body of natural language text to be searched, used by the invention. Plural: corpora.

Document match: The situation where a document satisfies a query.

FSM, finite-state recognizers: A device that receives a string of symbols as input, computes for a finite number of steps, and halts in some configuration signifying that the input has been accepted or else that it has been rejected.

Hypothesis: A guess at the correct interpretation of the words of a user's question, produced by the invention.

Inflected form: A form of a word that has been changed from the root form to mark such distinctions as case, gender, number, tense, person, mood, or voice.

Information retrieval, IR: The accessing and retrieval of stored information, typically from a computer database.

Keyword: A word that received special treatment when input to the invention; for example, a common function word or a command word.

Match sentences: Sentences in a document that cause or help cause the document to be retrieved in response to a query. Match sentences contain phrases that conform to the search terms and constraints specified in the query.

Orthographic: Pertaining to the letters in a word's spelling.

Phone: A member of a collection of symbols that are used to describe the sounds uttered when a person pronounces a word.

Phonetic transcription: The process of transcribing a spoken word or utterance into a sequence of constituent phones.

Query: An expression that is used by an information retrieval system to search a corpus and return text that matches the expression.

Question: A user's information need, presented to the invention as input.

Root form: The uninflected form of a word; typically, the form that appears in a dictionary citation.

Utterance: Synonym for question in embodiments of the invention that accept spoken input.

Word index: A data structure that associates words found in a corpus with all the different places such words exist in the corpus.

3. System Components

Certain system components that are common to the specific embodiments of the invention described in sections 4, 5, and 6 will now be described.

FIG. 1 illustrates a system 1 that embodies the present invention. System 1 comprises a processor 10 coupled to an input audio transducer 20, an output visual display 30, an optional output speech synthesizer 31, and an information retrieval (IR) subsystem 40 which accesses documents from corpus 41 using a word index 42. Also in system 1 are a phonetic transcriber 50, a hypothesis generator 60, a phonetic index 62, a query constructor 70, and a scoring mechanism 80. Certain elements of system 1 will now be described in more detail.

Processor 10 is a computer processing unit (CPU). Typically it is part of a mainframe, workstation, or personal computer. It can comprise multiple processing elements in some embodiments.

Transducer 20 converts a user's spoken utterance into a signal that can be processed by processor 10. Transducer 20 can comprise a microphone coupled to an analog-to-digital converter, so that the user's speech is converted by transducer 20 into a digital signal. Transducer 20 can further comprise signal-conditioning equipment including components such as a preamplifier, a pre-emphasis filter, a noise reduction unit, a device for analyzing speech spectra (e.g., by Fast Fourier Transform), or other audio signal processing devices in some embodiments. Such signal-conditioning equipment can help to eliminate or minimize spurious or unwanted components from the signal that is output by transducer 20, or provide another representation (e.g., spectral) of the signal.

Display 30 provides visual output to the user, for example, alphanumeric display of the texts or titles of documents retrieved from corpus 41. Typically, display 30 comprises a computer screen or monitor.

Speech synthesizer 31 optionally can be included in system 1 to provide audio output, for example, to read aloud portions of retrieved documents to the user. Speech synthesizer 31 can comprise speech synthesis hardware, support software executed by CPU 10, an audio amplifier, and a speaker.

IR subsystem 40 incorporates a processor that can process queries to search for documents in corpus 41. It can use processor 10 or, as shown in FIG. 1, can have its own processor 43. IR subsystem 40 can be located at the same site as processor 10 or can be located at a remote site and connected to processor 10 via a suitable communication network.

Corpus 41 comprises a database of documents that can be searched by IR subsystem 40. The documents comprise natural-language texts, for example, books, articles from newspapers and periodicals, encyclopedia articles, abstracts, office documents, etc.

It is assumed that corpus 41 has been indexed to create word index 42, and that corpus 41 can be searched by IR subsystem 40 using queries that comprise words (search terms) of word index 42 with Boolean operators and supplemental proximity and order constraints expressible between the words. This functionality is provided by many known IR systems. Words in word index 42 can correspond directly to their spellings in corpus 41, or as is often the case in IR systems, can be represented by their root (uninflected) forms.

Transcriber 50, hypothesis generator 60, phonetic index 62, query constructor 70, and scoring mechanism 80 are typically implemented as software modules executed by processor 10. The operation and function of these modules is described more fully below for specific embodiments, in particular with reference to the embodiments of FIGS. 2 and 8. It will be observed that corresponding elements in FIGS. 1, 2, 8, and 10 are similarly numbered.

3.1 Query Syntax

It is assumed that IR subsystem 40 can perform certain IR query operations. IR queries are formulated in a query language that expresses Boolean, proximity, and ordering or sequence relationships between search terms in a form understandable by IR subsystem 40. For purposes of discussion the query language is represented as follows:

| | |
|---|---|
| term | represents the single search term term. A term can be an individual word or in some cases another query. |
| <p term1 term2 . . . > | represents strict ordering of terms. The IR subsystem determines that a document matches this query if and only if all the terms enclosed in the angle brackets appear in the |

| | |
|---|---|
| | document within a sequence containing a maximum of p intervening words between the first and last words of the sequence (that is, a sequence of at most p+2 words) and in the exact order in which they appear in the brackets. The query <0 phrase> matches only the exact wording of phrase phrase. Strict ordering queries can be nested as in, for example, the query<br>    <5 <0 Abraham Lincoln> president> |
| (p term1 term2 ... ) | represents terms within a proximity of p words from one another, with no strict ordering imposed. The IR subsystem determines that a document matches this query if and only if all the terms enclosed in parentheses appear in the document within a sequence containing a maximum of p intervening words. For example, the query<br>    (3 big white ball)<br>matches a document containing a sentence that begins "Taking up the white ball, with the big bat in its hands, the gorilla began to play baseball . . ." because the sequence that begins with the first term matched ("white") and ends with the last term matched ("big") has no more than 3 intervening words between the first and last words of the sequence. The order of the terms within the sequence is not considered for this query. Proximity queries can be nested and can also contain strict ordering queries as in, for example, the query<br>    (20 <0 Abraham Lincoln><br>    (10 slavery freedom)) |
| [term1 term2 ... ] | represents a Boolean logical AND of terms. The IR subsystem determines that a document matches this query if and only if each of the terms within the square brackets occurs at least once in the document. AND queries can include proximity queries or strict ordering queries, as in, for example, the query<br>    [ <0 Abraham Lincoln><br>    (10 slavery freedom)] |
| {term1 term2 ... } | represents a Boolean logical OR of terms. The IR subsystem determines that a document matches this query if any of the terms within the curly brackets occurs at least once in the document. OR queries are commonly used as terms in AND, proximity, or strict ordering queries, as in, for example, the query<br>    (10 {president leader}<br>    {Lincoln Washington Kennedy}) |
| /term1 term2 ... \ | represents a Boolean logical NOT of terms. The IR subsystem determines that a document does NOT match this query if any of the terms between the slash and backslash occurs at least once in the document. NOT queries are commonly used as a limitation on other kinds of query, as in, for example, the query<br>    (10 president Washington)<br>    /<2 District Columbia>\ |

3.2 Discrete-Word and Continuous Speech

In some embodiments, the invention accepts discrete-word speech input. Typically, the user is expected to pause between each spoken word, so that the system can readily determine where one spoken word ends and the next begins. The system is thus freed of the task of determining word boundaries within the user's speech. In other embodiments, the invention accepts continuous speech input and attempts to determine the word boundary positions for itself.

Restricting the user to discrete-word speech increases computational efficiency, because the invention has fewer possible interpretations of the user's utterance to consider. An example illustrates why this is so. Suppose that the user speaks the phrase "how to recognize speech." In a continuous-speech embodiment, the invention must determine the word boundaries in this utterance; for example, it must decide whether the user has said "how to recognize speech" or "how to wreck a nice beach" or even "powdered egg and iced peach." The number of possible interpretations of a given utterance increases greatly when continuous speech is permitted.

There are at least two ways for the user to make word boundaries explicit:

a) By speaking the words with sufficient pauses between them to enable a word end-point detector to delineate the words.

b) By recognizing a set of specific words (called keywords) and providing a phonetic transcription for the speech not recognized as keywords. Keywords can include common function words (e.g., a, the, of, it, etc.) that can be ignored when they occur in the spoken input, and also command words that can signify special IR operations. Such operations can include, for example:

1. Boolean operations such as AND, OR and NOT. The NOT operation specifies that words formed from a subsequent phonetic transcription are not to be present in documents when matching is performed. Related operations include parenthesizing words that are to be grouped together in a Boolean operation, and explicitly specifying the proximity constraints to be used.

2. An operation that specifies that words formed from a subsequent phonetic transcription are to be treated as a strict sequence when matching is performed. This provides extra constraint when words are known to be likely to occur in a specific sequence, e.g., "atomic bomb" is more likely to occur as a phrase than "bomb atomic".

4. A First Specific Embodiment

The invention will now be described with reference to a first specific embodiment. This embodiment accepts discrete-word rather than continuous speech input. Keywords are not supported in this embodiment. The system of this embodiment of the invention is the system of FIG. 1.

Figure 2:
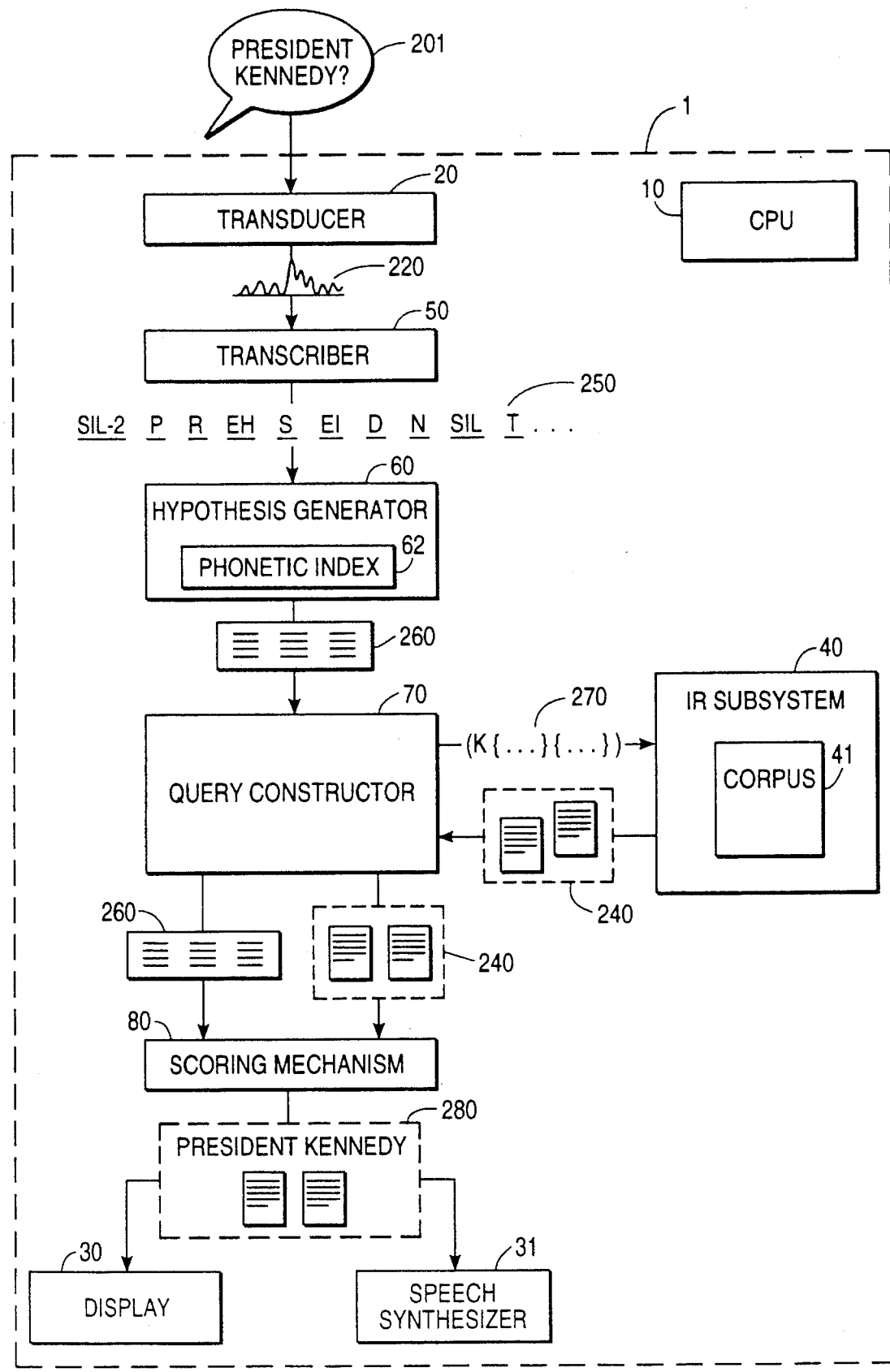
FIG. 2 schematically depicts information flow in a system according to a first specific embodiment of the invention.

FIG. 2 illustrates the information flow in the first specific embodiment. The user inputs a question 201 into system 1 by speaking into audio transducer 20. The signal 220 produced by transducer 20 is fed to transcriber 50, where it is converted into a phonetic transcription 250.

Transcriber 50 can be implemented using any of a variety of transcription techniques. One such technique, well-known among those of skill in the art, involves the use of statistical models called hidden Markov models. See. e.g., Lawrence R. Rabiner, "A Tutorial on Hidden Markov Models and Selected Applications in Speech Recognition," *Proceedings of the IEEE*, vol. 77, no. 2, Feb. 1989, pp. 257–285.

The phonetic transcription 250 is an ordered sequence of phones, that is, of component sounds that can be used to form words. Because the input speech is discrete-word speech in this embodiment, the phonetic transcription 250 comprises several smaller ordered sequences of phones, each such smaller sequence being a phonetic transcription of a single word of the user's utterance. Typically transcriber 50 is error-prone and produces a phonetic transcription 250 that is imperfect.

The phonetic transcription 250 is provided to hypothesis generator 60 where it is matched using phonetic index 62 to generate a set of hypotheses 260. In broad outline, hypothesis generation proceeds as follows: Within phonetic transcription 50 are one or more smaller sequences of phones, each of which corresponds to a single word spoken by the user. Each such smaller sequence of phones is analyzed, and sets of alternative phone sequences are developed. The phone sequences and their alternatives are compared against word pronunciations stored in phonetic index 62 to determine candidate words, that is, words that could be the words spoken by the user. Candidate words are concatenated to form hypotheses that represent possible interpretations of the user's entire utterance.

More particularly, hypothesis generation proceeds as follows: Because the transcriber 50 is known to be error-prone, hypothesis generator 60 develops alternative possible transcriptions for each word spoken by the user, in addition to the original phone sequences provided by transcriber 50. For example, hypothesis generator 60 can attempt to correct mistakes commonly made by transcriber 50 by adding, deleting, or substituting one or more phones into the sequence of phones that represents the word as originally transcribed. Such "correction" can be based, for example, on a statistical model of the performance of transcriber 50. Hypothesis generator 60 thus systematically generates different possible "corrected" versions of the word's transcription. Probabilities can optionally be associated with each alternate "corrected" transcription to express its relative likelihood based on the statistical model.

An example illustrates how "corrected" versions of a transcription can be developed. If the user speaks the word "president," it can be phonetically transcribed into a phone sequence (an erroneous phone sequence) such as

<SIL P R EH S IH D R N T SIL> where SIL represents a silence. If hypothesis generator 60 has information about the mistakes commonly made by transcriber 50 that includes the fact that transcriber 50 commonly outputs the phone "R" where the user intended no phone or the phone "EH", and commonly outputs the phone "D" where the user intended no phone, then it can develop the following alternative versions:

| | |
|---|---|
| <SIL P R EH S IH D EH N T SIL> | ("president") |
| <SIL P R EH S IH D N T SIL> | ("president") |
| <SIL P R EH S IH R N T SIL> | (a nonsense word) |
| <SIL P R EH S IH EH N T SIL> | ("prescient") |
| <SIL P R EH S IH N T SIL> | ("present") |

The hypothesis generator matches the original and "corrected" versions of the word transcription against phonetic index 62 to determine whether any of them match any words in phonetic index 62. This matching process is described in more detail below with reference to FIGS. 4 and 5. Hypothesis generator 60 considers each word that is matched in phonetic index 62 to be a candidate—a possibly valid interpretation of the user's intended word.

Hypothesis generator 60 repeats the matching process for each word of the user's utterance until it has candidates for all the words of the utterance. It then concatenates all possible combinations of candidates according to the sequence of words in the utterance to generate the set of hypotheses 260. If the user's utterance is a sequence of N words $W_i$, then the hypotheses are of the form <candidate($W_1$) candidate($W_2$) ... candidate($W_i$) ... candidate($W_N$)>

For example, if the user speaks two words, and the candidates for the first word are "precedent," "president," "resident," "prescient," and "present," and the candidates for the second word are "kennedy," "kenny," "canada," and "tenant," then these hypotheses are generated:

| | |
|---|---|
| precedent kennedy | precedent canada |
| president kennedy | president canada |
| resident kennedy | resident canada |
| prescient kennedy | prescient canada |
| present kennedy | present canada |
| precedent kenny | precedent tenant |
| president kenny | president tenant |
| resident kenny | resident tenant |
| prescient kenny | prescient tenant |
| present kenny | present tenant |

If there are $n_i$ phonetic index matches (that is, $n_i$ candidates) for the ith word of the sequence, then the number of hypotheses is $n_1 \times n_2 \times n_3 \times \ldots \times n_i \times \ldots \times n_W$.

In the above example, there are 5 candidates for the first word and 4 for the second, for a total of 20 hypotheses. (It will be appreciated that in some implementations, the hypotheses can be represented more compactly as a sequence of the candidate sets, so that each individual hypothesis need not be explicitly represented as in this example.)

Occasionally, no candidates will be found for one or more words of the user's utterance. This can happen, for example, if part of the utterance is garbled. In this case, hypothesis generator 60 can omit the unrecognized word from the generated hypotheses. Alternatively, hypothesis generator 60 can halt processing of the user's question and prompt the user to repeat the question. This course of action can be adopted, for example, if none of the user's words is recognized.

Once the set of hypotheses 260 has been generated, it is provided to query constructor 70. Query constructor 70 uses the hypotheses 260 to construct one or more queries 270 that will be sent to IR subsystem 40 for execution. Queries 270 are Boolean queries with proximity and order constraints. In this embodiment, an initial query that is constructed is of the form:

```
(k      {all candidates for word 1}
        {all candidates for word 2}
        ...
        {all candidates for word i}
        ...)
```

Here, k is a proximity constraint value, e.g., 5, 10, or 20. For example, suppose that the user speaks two words, and the set of hypotheses 260 is:

| president | kennedy |
| present | kennedy |
| president | canada |
| present | canada |

Then if k=10, the initial query that query constructor 70 constructs is:

(10 {present president} {kennedy canada})

This query seeks occurrences of at least one of the words (search terms) "present" or "president" within a proximity of 10 words of at least one of the words "kennedy" or "canada." The initial query is sent to the IR subsystem 40 where it is executed.

Depending on the results obtained from execution of the initial query, additional queries can be constructed and executed, in a process called query reformulation. For example, if no matches are found for the initial query, query constructor 70 can increase the proximity value k, for example to 20, and send the query thus modified back to IR subsystem 40 to be executed again. Alternatively or in addition, query constructor 70 can drop one or more words from the query. This can be helpful, for example, if one of the user's intended words is not present in phonetic index 62, so that none of the candidates for this word is correct. Query reformulation is described in further detail with reference to FIG. 6 below. In general, a series of queries 270 is constructed by query constructor 70 and provided to IR subsystem 40, which executes them by conducting searches in accordance with queries 270 over corpus 41.

The execution of the initial and any additional queries causes a set of documents 240 to be retrieved from corpus 41. Each of the retrieved documents 240 matches one or more of the queries 270, that is, contains search terms of one or more of the queries 270 with the specified proximity and order relationships. For example, a document that contains the phrase "President John F. Kennedy" matches the query (10 {present president} {kennedy canada}), because it contains the search terms "president" and "kennedy" within 10 words of each other.

The retrieved documents 240 and the query matches that they contain are provided along with hypotheses 260 to scoring mechanism 80. Scoring mechanism 80 assigns scores to the various hypotheses 260 according to probable relevance to the user's input question 201 and ranks the hypotheses 260 according to the scores thus assigned. This provides the invention with the ability to determine which hypothesis or hypotheses best match the user's intended utterance. Scoring mechanism 80 outputs a set of results 280 that comprises the top-ranked hypotheses, and can in association with these hypotheses further comprise the retrieved documents that support the hypotheses, the queries used to retrieve those documents, and the matched search terms within the retrieved documents.

A hypothesis receives a score based on the number of query matches it generates. For example, if the hypothesis "president kennedy" is being scored, it receives a point for each of its occurrences in the corpus, that is, for each instance in which the words "president" and "kennedy" were found in the corpus within the desired proximity of one another. Additional or different scoring criteria can be used in other embodiments. Such criteria can include, for example, the number of distinct documents in which a hypothesis occurs; the total number of occurrences of the hypothesis or its constituent words in any one document; the number of words of the hypothesis that appear in a document title; and the probability scores associated with the "corrected" transcriptions that gave rise to the hypothesis in the first place. Documents can be scored along with the hypotheses to determine, for any given hypothesis, which documents are most likely to be relevant to that hypothesis. Scoring is described in further detail with reference to FIG. 7 below.

When scoring is finished, the results 280 can be presented to the user using processor 10 in conjunction with visual display 30. Typically, the user's question as interpreted according to the best of the hypotheses 260 is displayed in conjunction with the titles of a reasonable number (e.g., between 1 and 30) of the highest-ranked retrieved documents. Excerpts of the documents showing the occurrence of the matched search terms therein are also typically displayed. Additional output can be made using processor 10 in conjunction with optional speech synthesizer 31 if such synthesizer is included in system 1. The speech output can be, for example, a synthetic reading of document titles or selected text portions from retrieved documents.

Figure 3:
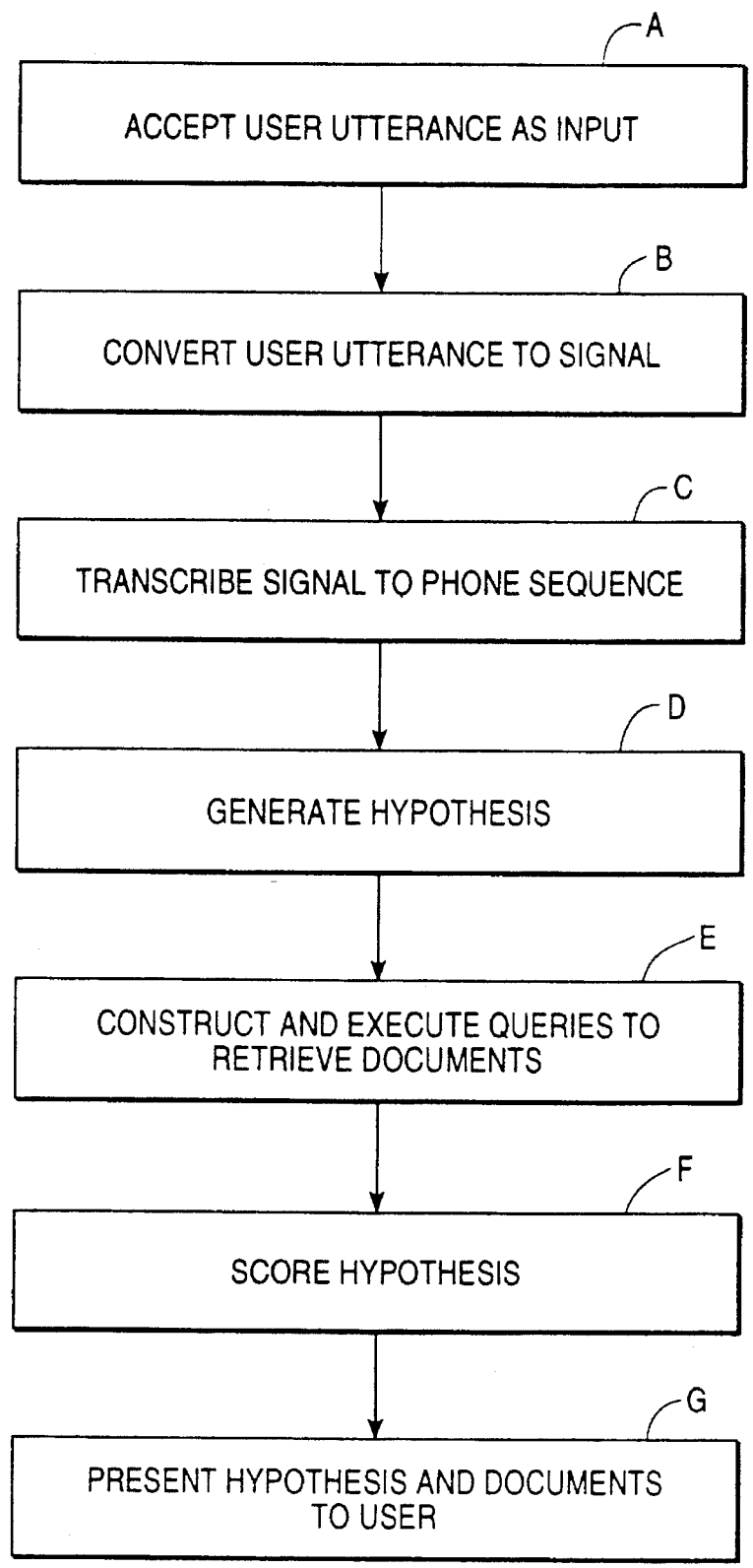
FIG. 3 is a flowchart of method steps carried out according to a first specific embodiment of the invention.

The flowchart of FIG. 3 summarizes the method or processing steps performed by the system of FIG. 2. First the system accepts a user utterance as input (Step A). This utterance is converted to a signal (Step B) that is transcribed into a sequence of phones (Step C). The phone sequence is used to generate hypotheses (Step D). Boolean queries with proximity and order constraints are constructed based on the hypotheses and are executed to retrieve documents (Step E). Hypotheses are scored in order of relevance (Step F). A relevant subset of the hypotheses and retrieved documents is presented to the user (Step G).

4.1 Phonetic Index Matching

Figure 5:
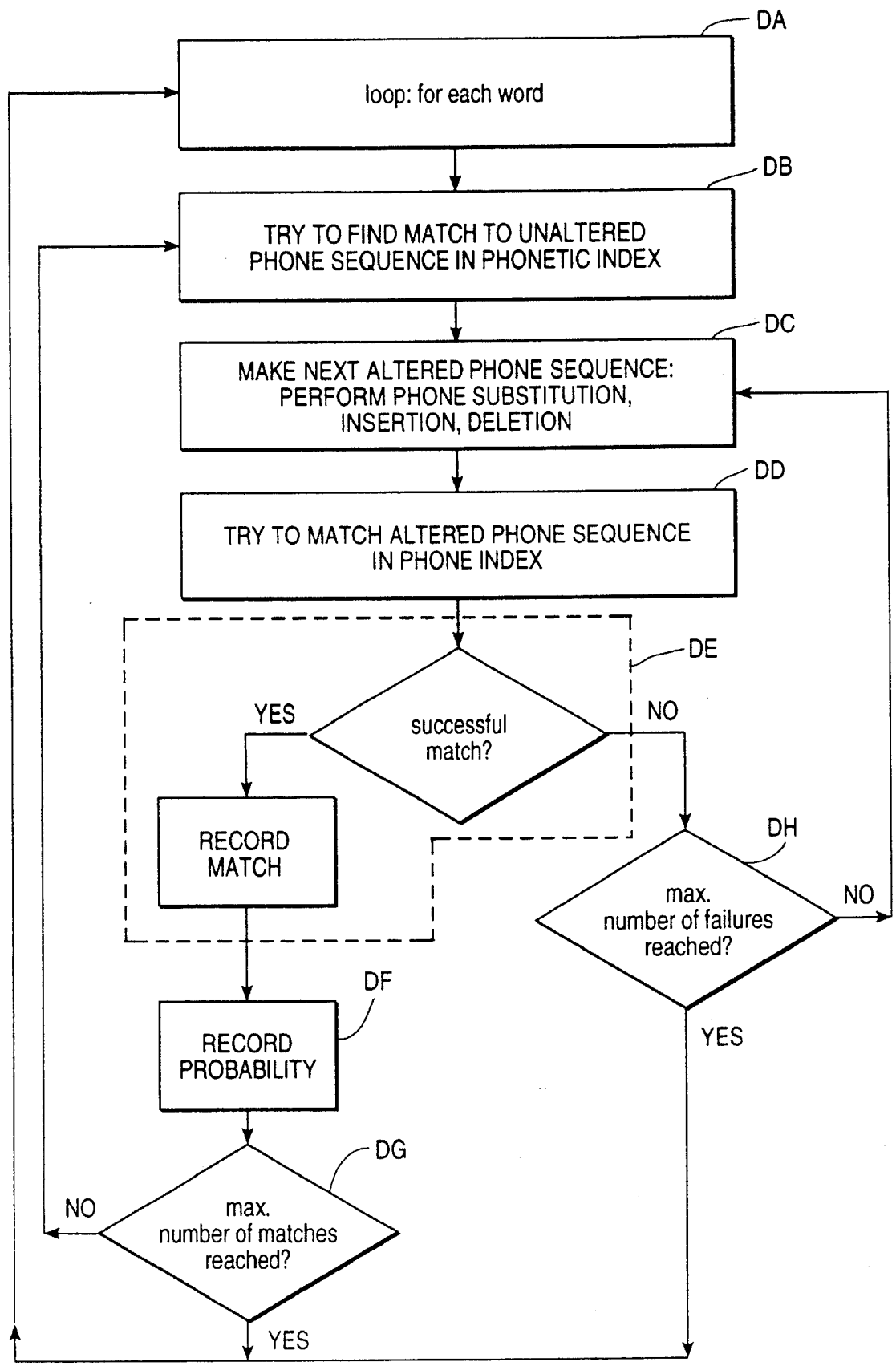
FIG. 5 is a flowchart of steps for phonetic index matching.

The process of matching in the phonetic index, which is part of hypothesis generation, will now be examined in more detail with reference to FIGS. 4 and 5.

Phonetic index 62 is a data structure that stores word spellings (orthographic forms) in association with word pronunciations (spoken forms). Typically, each word in phonetic index 62 is associated with its most common pronunciation(s). Pronunciations are represented as phone sequences in a form that can readily be compared with the phone sequences produced by transcriber 50 and "corrected" versions of these sequences produced by hypothesis generator 60.

FIG. 4 depicts a conceptual model of a portion of phonetic index 62. In this model, phonetic index 62 is represented as a table 310 that comprises entries 315. Each of the entries 315 comprises a spelling and a pronunciation for a single word. Some entries can include two or more spellings associated with a single pronunciation, to indicate that two or more words sound alike (homonyms), for example, "canon" and "cannon." In cases where a single word is subject to more than one pronunciation, there can be (but need not be) multiple entries corresponding to the same word. Alternatively, a single entry can include multiple pronunciations. It will be observed that because hypothesis generator 60 develops alternative pronunciations, in many instances a user's variant pronunciation of a word can be converted by hypothesis generator 60 to the pronunciation of the word as found in phonetic index 62.

Although table 310 represents conceptually the association between pronunciations and orthographic spellings in phonetic index 62, it will be appreciated by those of skill in the art that a linear search through table 310 is computationally inefficient. Accordingly, in practice a more compact and computationally efficient representation of phonetic index 62 is preferable. In one such representation, the orthographic spellings are stored in a vector and the phone sequences are represented by a finite-state network that provides an index (or indices) into the vector. This technique is substantially similar to the minimal perfect hashing technique described in Lucchesi, Claudio L. and Tomasz Kowaltowski, "Applications of Finite Automata Representing Large Vocabularies," *Software—Practice and Experience,* vol. 23(1), pp. 15–30, January 1993 (see especially pp. 26–27). Other representations that can be used include word-trie representations.

The words included in phonetic index 62 are words that the user is likely to speak as input. Typically, they include some or all of the words of word index 42, as well as additional keywords, such as command words to be treated specially on input and common function words to be ignored on input. Because the words of phonetic index 62 are taken from word index 42, they are guaranteed to be present in corpus 41. This means that hypotheses 260 generated using phonetic index 62 contain words from corpus 41 and so are suitable for use in query construction by query constructor 70.

It will be appreciated that the vocabulary of phonetic index 62 need not be exhaustive: Although all words in phonetic index 62 appear in word index 42 and thus in corpus 41, there can be words in word index 42 or in corpus 41 that do not appear in phonetic index 62. If transcriber 50 produces a phone sequence for which phonetic index 62 contains no word, hypothesis generator 60 can nevertheless generate a hypothesis or hypotheses. Most often, hypothesis generator 60, through its attempts to "correct" the pronunciation of a word, can generate a spurious match, that is, a match to a word that is present in phonetic index 62 but that the user did not intend. The query construction process is sufficiently robust to accommodate the absence of correct candidates for one or more words of a hypothesis; in particular, query constructor 70 can drop search terms from a query during query reformulation if few matches are found. Less commonly, if no matches whatsoever are found in phonetic index 62, hypothesis generator 60 can simply omit the unmatched word and generate a hypothesis based on the remaining words in the user's utterance.

FIG. 5 flowcharts the steps involved in matching phonetic transcriptions. These steps are carried out by hypothesis generator 60. FIG. 5 is an expansion of a portion of Step D of the flowchart of FIG. 3.

A loop is executed for each word of the user's utterance (Step DA). First an attempt is made to match the sequence of phones corresponding to the word to a word or words in phonetic index 62 (Step DB). The matching involves a phone-by-phone comparison between the phone sequence and entries in the index. An exact match is required; that is, the phone sequence as transcribed must be exactly the same as the phone sequence of a stored word pronunciation in order for a match to occur.

Thereafter, the phones of the phone sequence are examined for possible substitutions, additions, or deletions according to a statistical performance model of transcriber 50. Substitutions, additions, and deletions are tried systematically, alone and in combinations, to generate a series of alternative, "corrected" pronunciations. Various search strategies can be used to determine what order to apply the substitutions, additions, and deletions; in general, the most likely changes are tried sooner and the less likely changes are tried later.

The statistical performance model of transcriber 50 can be implemented through a set of tables. For each phone, the substitution table contains the various probabilities that the correct transcription for the phone is in fact a different phone (e.g., the probability that the phone "b" in the output of transcriber 50 corresponds to another phone that was actually spoken, such as "p"). The substitution table is ordered in terms of decreasing substitution probabilities. In like manner, there are also insertion and deletion tables, similarly ordered, for insertion and deletion errors respectively. An insertion error means that an extra phone was inserted by transcriber 50 where none was intended by the speaker, and a deletion error means that transcriber 50 omitted a phone that was in fact intended by the speaker. The probabilities of substitution, insertion, and deletion errors are estimated with the aid of an alignment program, which is one of several methods available for estimating the best correspondence of a known transcription of a speech signal with the phonetic output from transcriber 50. Probabilities can be calculated independently of the phonetic context in which they occur, or can be based on context to provide more accurate probabilities (for example, the likelihood that the transcriber will register the phone "k" in the word "keep" can be different from the likelihood that it will register the phone "k" for the somewhat different k-sound in the word "claw").

As each new alternative pronunciation is generated (Step DC), an attempt is made to find a corresponding word or words in phonetic index 62 (Step DD). This matching proceeds in the much same manner as for the original phone sequence: through a phone-by-phone comparison between the "corrected" alternative and the stored pronunciations. Once again, an exact match is required.

As matches are found, they are recorded (Step DE). Also recorded in association with each match is a probability that represents the relative likelihood, based on the statistical model, that the particular transcription errors that give rise to this "corrected" alternative would in fact have occurred (Step DF).

The development of alternative pronunciations and the search for matches continues until either a certain number of matches (e.g., 30) is found (Step DG), or until a certain number of consecutive unsuccessful match attempts (e.g., 15,000) occurs (Step DH).

4.2 Query Reformulation

Figure 6:
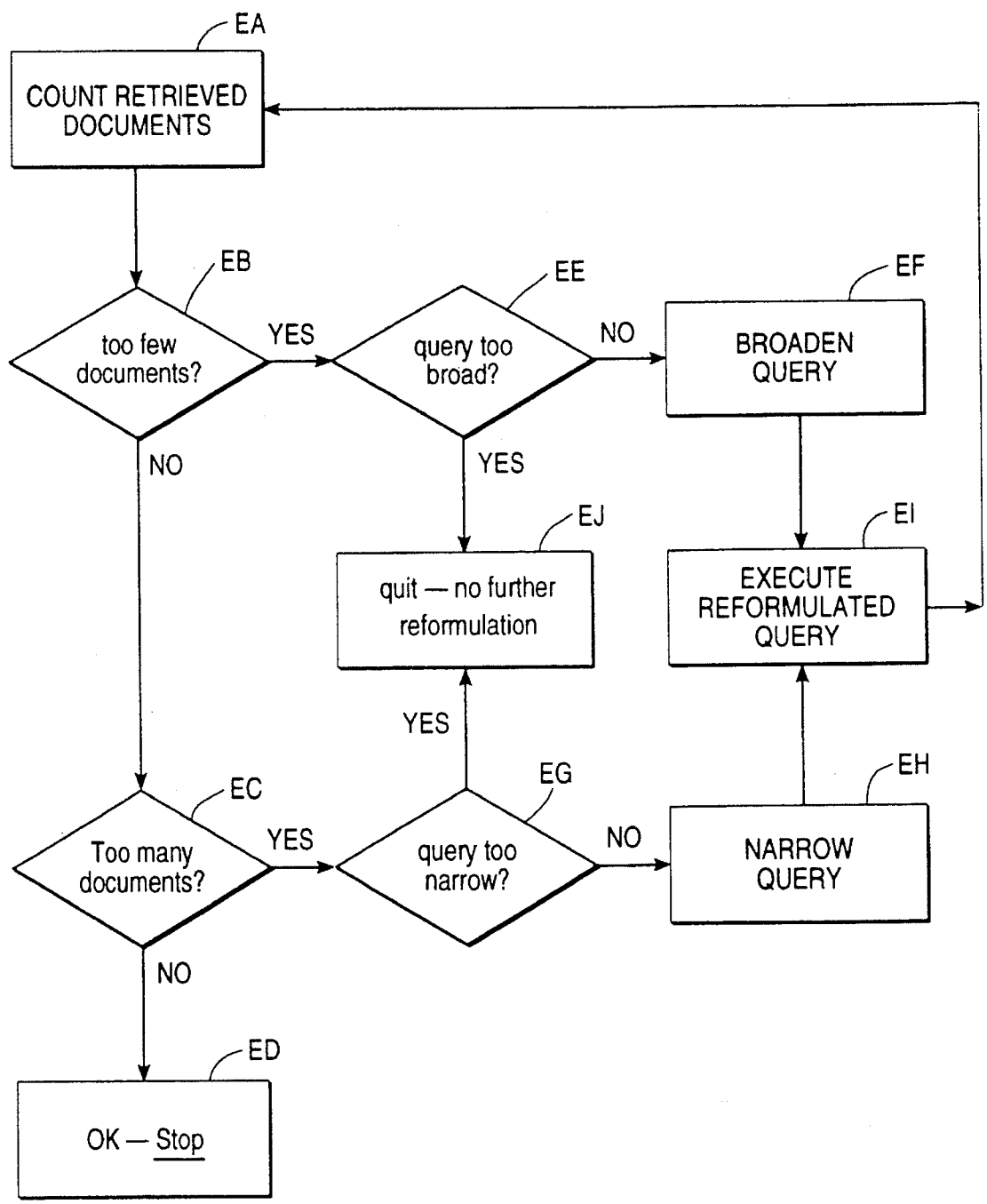
FIG. 6 is a flowchart of steps for query reformulation.

FIG. 6 flowcharts the steps involved in query reformulation. These steps are carried out by query constructor 70 in conjunction with information retrieval subsystem 40. FIG. 6 is an expansion of a portion of Step E of the flowchart of FIG. 3.

Query reformulation is the process of modifying the initial query constructed by query constructor 70 and executing the query thus modified using IR subsystem 40. The initial query can be modified and re-run once, many times, or not at all, depending on the results obtained at each from executing each intermediate query.

Upon execution of the initial query, the IR subsystem returns a set of documents that match the search terms and constraints of the query. To determine whether any additional queries are necessary, query constructor 70 performs a preliminary analysis of the returned documents (Step EA). In this embodiment, query constructor 70 counts the number of documents returned. The number of documents is then tested against a predefined minimum value such as 15 (Step EB) and a predefined maximum value such as 50 (Step EC). If the number of documents is reasonable, that is, greater than or equal to the minimum value and less than the maximum value, then no additional queries are deemed necessary (Step ED).

If there are too few retrieved documents, then an attempt is made to broaden the query. To broaden a query is to modify it in such a way that the number of documents likely to be retrieved upon its execution increases. First, a check is made to see whether the query can helpfully be broadened further (Step EE). This check is performed to ensure that queries are not broadened indefinitely, and to prevent an infinite loop of broadening and narrowing operations. If the check succeeds, then the query is broadened (Step EF).

Broadening can be carried out in several ways. The proximity value k can be increased over a range of values, e.g., 10, 20, 40, and the proximity constraint can be then dropped altogether so that a simple AND query over the scope of the entire document is performed. To further broaden the query, one or more individual words can be dropped from the query. For example, if the initial query is (10 {present president} {kennedy canada})

then increasing the proximity constraint to 20 and then to 40 yields the broadened queries (20 {present president} {kennedy canada})

(40 {present president} {kennedy canada})

Dropping the proximity constraint in favor of an AND query produces

[{present president} {kennedy canada}]

Dropping the first word of the user's utterance from the query gives

[{kennedy canada}]

and dropping the second word gives

[{present president}]

Words can be selected to be dropped according to the probabilities associated with them during "correction" of transcription; that is, if all the candidates for a particular word are of low probability, this suggests that the word was garbled or otherwise not well-transcribed and should be dropped. Still other broadening techniques can be devised and used, for example, consulting a thesaurus to generate synonyms of search terms.

Broadening by dropping words is particularly important because it can happen that some words of the user's question, even when correctly phonetically transcribed, do not co-occur in relevant documents with other words of the user's question. Dropping words makes it possible for subsets of the words in the transcribed question to be matched against documents. A series of IR queries can be made using different combinations of words from the transcribed question.

If there are too many retrieved documents, then an attempt is made to narrow the query. To narrow a query is to modify it in such a way that the number of documents likely to be retrieved upon its execution decreases. First, a check is made to see whether the query can helpfully be narrowed further (Step EG). This check is performed to ensure that queries are not narrowed indefinitely, and to prevent an infinite loop of broadening and narrowing operations. If this check succeeds, then the query is narrowed (Step EH).

Narrowing can be carried out in several ways. The proximity constraint can be narrowed, either overall or between pairs of words in the utterance. The latter technique is helpful for words that tend to appear together, such as "united" and "states" in the phrase "United States." Other narrowing techniques include imposing an order constraint on some or all of the user's words, so that in order for a match to occur the words are required to appear in the text in the same order they occurred in the user's utterance. Yet another way to narrow a query is to duplicate individual words in the query, using the same or a broader proximity constraint. This tends to locate documents in which words recur, suggesting that these words are closely related to the topic of the document and thus tending to retain only the most relevant documents.

Once the query has been broadened or narrowed, the query thus modified is sent to IR subsystem 40 where it is executed (Step EI). Results from the broadened or narrowed query are once again analyzed (Step EA) and the count of returned documents is once again checked to see whether too few (Step EB) or too many (Step EC) documents have been returned. If the number of documents is now reasonable, query reformulation stops (Step ED); otherwise, further broadening or narrowing occurs (Steps EE through EI). The loop of broadening or narrowing proceeds until either a reasonable number of documents is found (Step ED) or no further broadening or narrowing is deemed helpful (Step EJ).

If query reformulation terminates successfully (in Step ED) with a reasonable number of documents retrieved, these documents are passed on to scoring mechanism 80 for scoring. If query reformulation terminates unsuccessfully (in Step EJ) with too few or too many documents retrieved, either such documents as have been retrieved can be passed on for scoring, or, alternatively, no documents can be passed on and an error message can be displayed to the user on visual display 30.

4.3 Scoring

Figure 7:
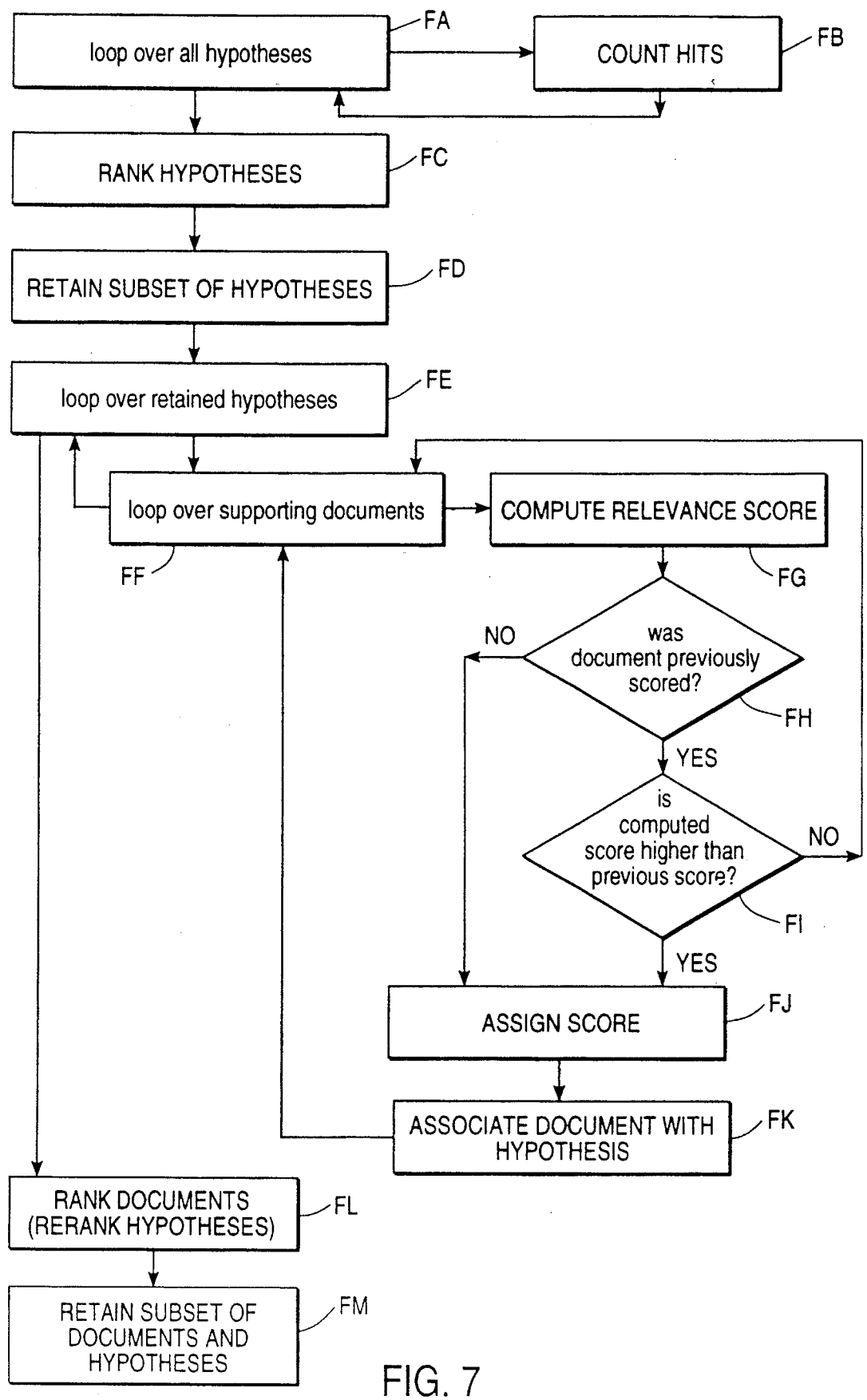
FIG. 7 is a flowchart of steps for scoring.

FIG. 7 flowcharts the steps involved in scoring hypotheses. These steps are carried out by scoring mechanism 80, typically in conjunction with IR subsystem 40. FIG. 7 is an expansion of a portion of Step F of the flowchart of FIG. 3.

In overview, scoring is a two-stage process. First, hypotheses are ranked to determine which of the hypotheses are most likely to represent a correct interpretation of the user's utterance—that is, which of the hypotheses probably say what the user intended to say. Second, for each preferred hypothesis, retrieved documents are ranked to determine which retrieved documents are most likely to be relevant to the particular hypothesis.

In more detail, scoring proceeds as follows: A loop is performed over all hypotheses (Step FA). For each hypothesis, the number of matches ("hits") is computed (Step FB). This is the number of places in the corpus where the query whose results were passed on to scoring mechanism 80—that is, the query considered to be the most successful after any and all broadening and narrowing operations were completed-was satisfied by the hypothesis in question. Typically, scoring mechanism 80 computes the number of hits for a particular hypothesis by scanning the retrieved documents for matched search terms that correspond to the hypothesis. Alternatively, scoring mechanism 80 can compute the number of hits by a conceptually equivalent procedure in which it constructs an auxiliary query that is specific to the particular hypothesis, executes this hypothesis-specific query using IR subsystem 40, and counts the number of hits returned. The auxiliary query is a specialization for the particular hypothesis of the most successful query executed during query,reformulation, wherein each search term in the query is a word in the particular hypothesis rather than a Boolean OR of all possible candidate words from all hypotheses. For example, if the hypothesis is "president kennedy" and the most successful query executed during query reformulation was (5 {present president} {kennedy canada})

then the number of "hits" for the hypothesis "president kennedy" is the number of matches to the query (5 president kennedy)

in the retrieved documents.

After the number of hits for each hypothesis has been determined, the hypotheses are sorted in order from highest to lowest rank (step FC). A subset of the highest-ranked hypotheses is then retained for further processing (Step FD); for example, a predetermined number (e.g., 1, 10, or 50) of the highest-ranking hypotheses can be retained, or hypotheses for which more than a predetermined number of hits (e.g., 5) were retrieved can be retained.

Next, the retrieved documents are scored. A loop over the retained hypotheses is performed (Step FE). For each hypothesis, a loop over the documents which support that hypothesis is performed (Step FF). For each supporting document, a relevance score is computed (Step FG). This score expresses the relative likelihood that the document in question is relevant to the hypothesis in question. If the document has not yet been assigned a score (Step FH), the relevance score is assigned to the document (Step FJ), and the document is associated with the hypothesis (Step FK). Otherwise, if the document has previously received a score (in association with another hypothesis), the document's present score is compared to the relevance score (Step FI). If the relevance score is higher than the document's present score, the relevance score is assigned to the document, replacing its present score (Step FJ), and the document is associated with the hypothesis (Step FK). Thus, upon completion of the loop over hypotheses, each document is assigned to the hypothesis to which it is most likely relevant, and has a score based on the hypothesis to which it is assigned.

Relevance scores are computed in heuristic fashion. They can be based on one or more criteria, including, for example:

(1) the number of times the hypothesis or its constituent words appears within a document;

(2) the occurrence of one or more words of the hypothesis in a document's title;

(3) the probability that the words of the hypothesis represent correct transcriptions of the user's speech, as indicated by the probabilities that were optionally associated with each alternate "corrected" word transcription to express its relative likelihood based on the statistical model of the performance of transcriber 50.

Once all documents have been scored for all retained hypotheses, the documents are ranked in order from highest to lowest score (Step FL). It will be appreciated that because the documents are associated with particular hypotheses, this ranking of the documents effectively re-ranks the hypotheses as well. A subset of the highest-ranked documents is retained for further processing (Step FM); for example, a predetermined number (e.g., between 1 and 30) of the highest-ranking documents can be retained. The retained documents and the hypotheses with which they are associated are the hypotheses and documents that are subsequently presented to the user on output (Step G of FIG. 3).

It will be appreciated that alternative methods for scoring and ranking hypotheses and documents can be used in other embodiments. It will be further appreciated that although in the specific embodiment described, scoring is performed separately from query reformulation, these steps can be more tightly integrated in other embodiments. For example, an assessment of document rankings based on a number of simple criteria can be used as a basis for determining whether to construct and execute additional queries.

5. A Second Specific Embodiment

The system and method of the invention will now be described with respect to a second specific embodiment. This second embodiment incorporates user relevance feedback and supports keywords. Like the first specific embodiment described above, it accepts discrete-word rather than continuous speech input. Once again, the system of this embodiment of the invention is the system of FIG. 1.

Figure 8:
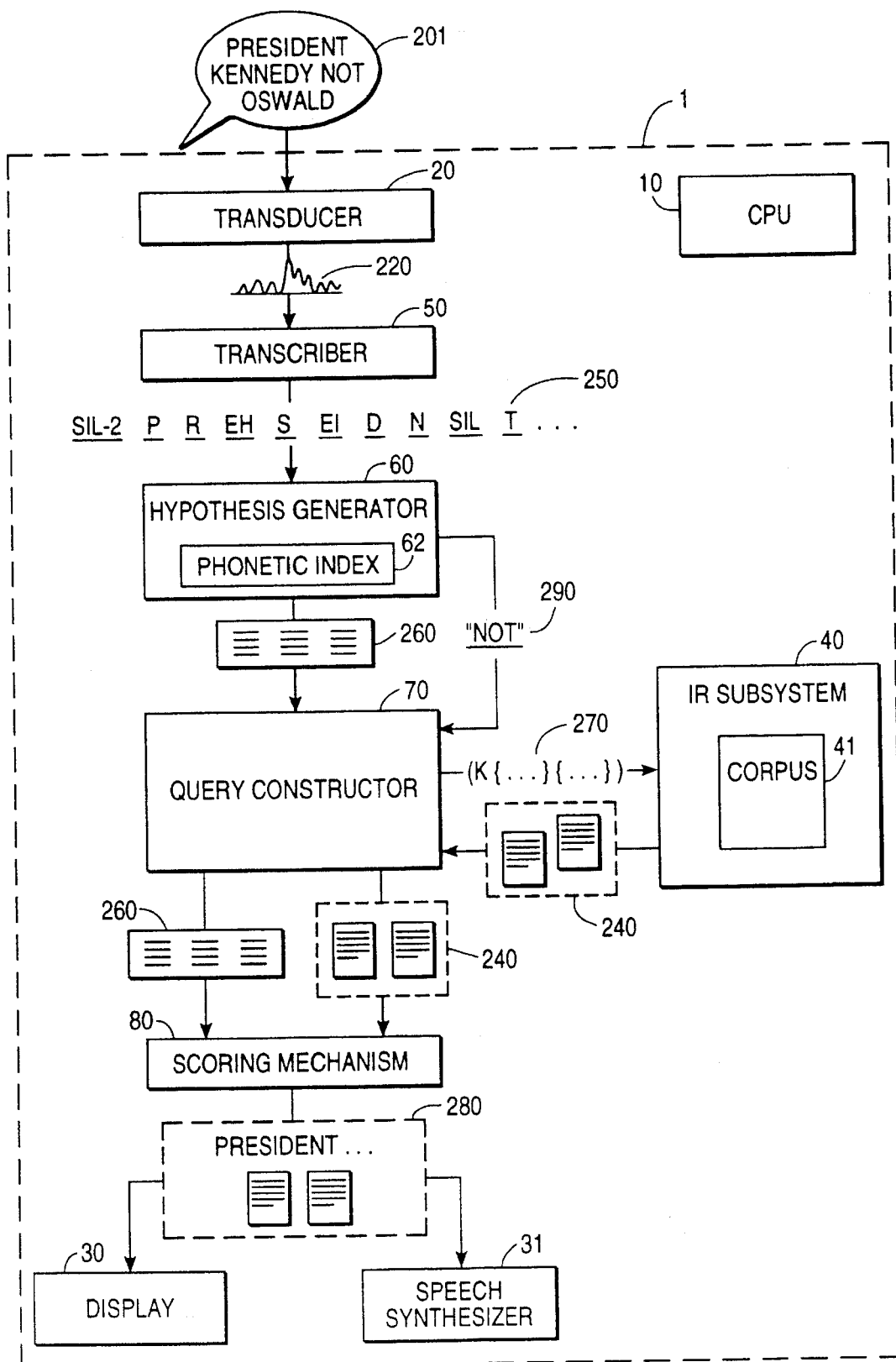
FIG. 8 schematically depicts an example of information flow in a system according to a second specific embodiment of the invention.

FIG. 8 illustrates an example of information flow in the second specific embodiment. Insofar as the information flow is similar in many respects to that shown in FIG. 2 for the first specific embodiment, only the differences between the two embodiments will be pointed out here. The user question 201 is transduced into a signal which is converted into a phonetic transcription 250 by transcriber 50 as in the first embodiment. However, after phonetic transcription 250 is passed on to hypothesis generator 60, keywords are trapped by hypothesis generator 60 and processed separately from other words. Keywords are assumed to be correctly transcribed, and no checking of alternative or "corrected" pronunciations is performed for keywords. Keywords can be single words or longer phrases.

Three kinds of keywords are supported in this embodiment:

(1) Common function words. These include words such as "a," "an," "the," "of," "any," etc. Words of the input utterance that match a common function word in the phonetic index can be ignored for purposes of hypothesis generation and query construction. For example, if the user's utterance is "climb a mountain," possible hypotheses can be, e.g., climb mountain climber mountain climb mounting climber mounting The word "a" is recognized as a function word and is eliminated from the hypotheses. If the word "a" is misrecognized as "bay," however, it is included in the hypothesis, e.g., climb bay mountain
climb bay mounting and so forth.

(2) Command words. The user can supply keywords that signify special IR operations to be carried out during query construction. This includes the Boolean keywords "and," "or," and "not," and also keywords to indicate that terms should be queried in strict order or within a certain proximity of one another. The special IR operations can be communicated to query constructor 70 via one or more commands 290, as shown in FIG. 8.

For example, if the user's question is "president kennedy NOT oswald," query constructor 70 generates queries such as (10 {president present prescient} {kennedy canada}) \\{oswald osgood asphalt}/

Other kinds of command keywords can also be available. For example, a command can indicate that the words that follow it, which ordinarily would be ignored as common function words, are to be included in the hypotheses. This allows the user to cause documents to be retrieved in response to utterances such as "To be or not to be." Other commands can be used to select among competing hypotheses. For example, if the invention determines that the two best interpretations of the user's utterance, as indicated by the highest-ranked hypotheses, are "president kennedy" and "present-day canada," the user can indicate that "president kennedy" is the better choice.

(3) Relevance feedback commands. After the user's question has been processed, so that documents have been retrieved and presented in response to the question, the user has the option of directing the invention to perform a follow-up search based on the retrieved results. For example, suppose the user's initial question is "president kennedy" and that the best hypothesis, "president kennedy," is displayed in conjunction with the titles of several relevant documents, including a document entitled "Warren Commission" (which describes the Warren Commission's investigation of President Kennedy's assassination). At this point, the user has the option of saying, "Tell me more about the Warren Commission." The keyword phrase "Tell me more about" signals the invention that the question that follows is to be treated differently from a normal question and, in particular, that its words can be found among the displayed titles. This means that there is no need for a search in the corpus at large to determine the best interpretation of the user's question. Instead, the displayed document titles are used as a "mini-corpus" to determine the best transcription of the user's question. The correct document title is identified, and additional documents that contain words similar to the words contained in the identified article are retrieved (e.g., using vector space search techniques). These documents can be displayed to the user along with the documents originally retrieved. The user can supply further commands using the titles of the "president kennedy" and "warren commission" documents to cause still further documents to be retrieved. For example, the user can say, "Tell me more about Lee Harvey Oswald but NOT Jack Ruby." To discard or save results and proceed with a new search, the user can say other keywords, e.g., "save," "quit," "new search," etc.

In general, the best matching documents that correspond at any time to the words that the user has spoken so far can be displayed to the user on a screen. Upon seeing the titles (or other descriptive content) the user can speak additional words to direct the search to particular documents or cause them to be excluded by invoking the NOT operation.

Figure 9:
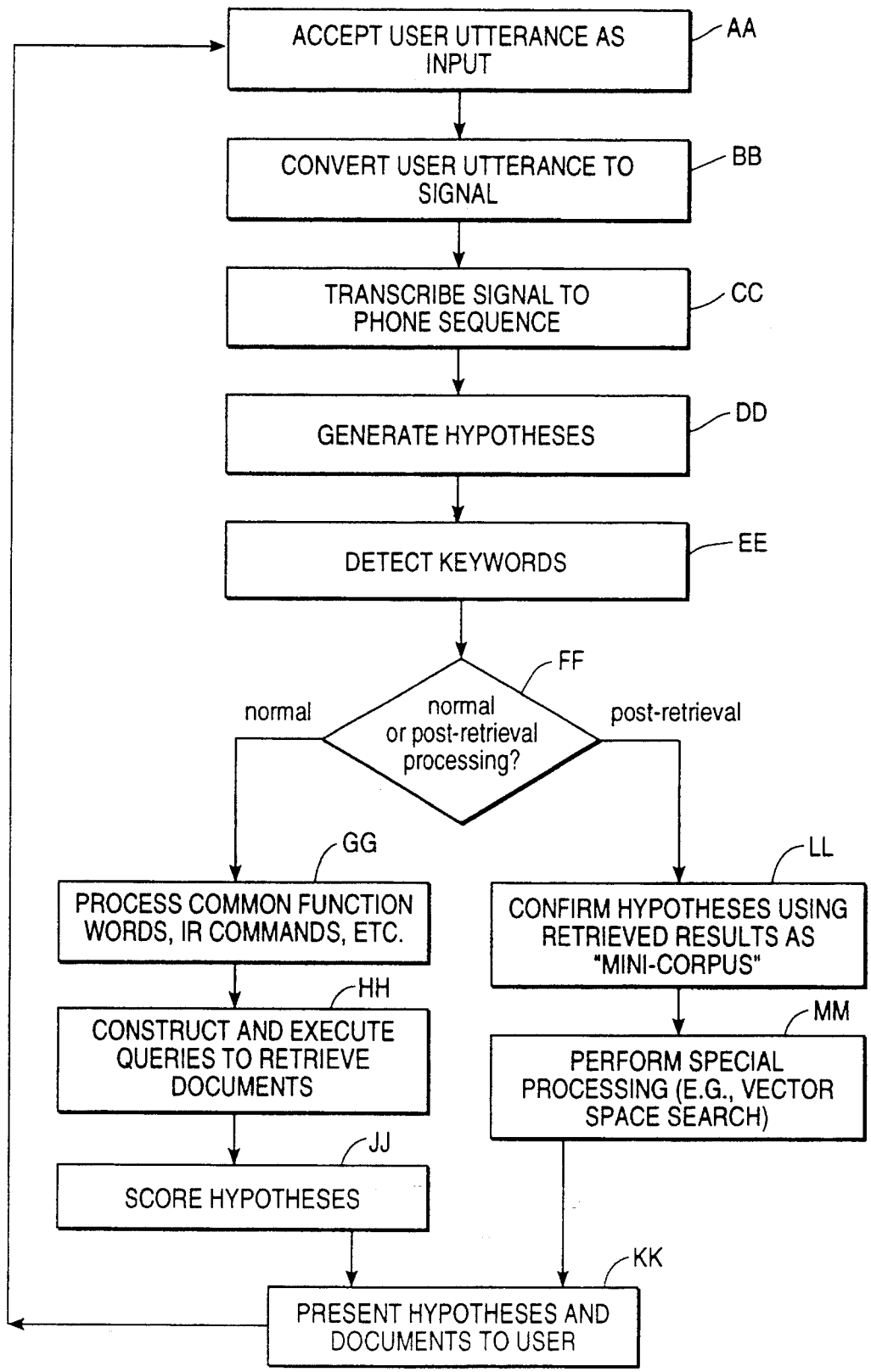
FIG. 9 is a flowchart of method steps carried out according to a second specific embodiment of the invention.

The flowchart of FIG. 9 summarizes the processing steps performed according to the method of the second embodiment. The system accepts a user utterance as input (Step AA). This utterance is converted to a signal (Step BB) that is transcribed into a sequence of phones (Step CC). The phone sequence is used to generate hypotheses (Step DD); keywords in the phone sequence are trapped for special processing (Step EE). A test is made to determine whether documents have previously been retrieved since the last "new search" or similar command (step FF). If no documents have been retrieved, then a search for documents is made. Prior to query construction, keywords are processed (Step GG); in particular, common function words can be filtered out of the hypotheses, and IR command words are routed to the query constructor, where they can be interpreted and incorporated into queries. Thereafter, Boolean queries with proximity and order constraints are constructed based on the hypotheses and the keywords, and these queries are executed to retrieve documents (Step HH). Hypotheses are scored in order of relevance (Step JJ). A relevant subset of the hypotheses and retrieved documents is presented to the user (Step KK). If documents have previously been retrieved, then user relevance feedback commands and search terms can be routed to the hypothesis generator, to instruct the hypothesis generator to use retrieved document titles as the basis for confirming hypotheses (Step LL), or to cease doing this upon a "new search" or similar command. The system then can perform operations such as a vector space search or the selection of one among several preferred hypotheses (Step MM). Results of these operations are presented to the user (Step KK).

6. Variations and Extensions

Beyond the specific embodiments described above, additional variations and extensions of the present invention will be apparent to those of skill in the art. Some of these will now be described. This section (section 6) concerns certain alternatives that can be used in implementing embodiments such as those previously described, i.e., embodiments that accept speech input and are used primarily for information retrieval, and can be used in certain other embodiments as well. Section 7 concerns an embodiment that is not limited to IR tasks, and Section 8 concerns an embodiment in which the input can take forms besides speech.

6.1 Alternative Implementations of the Phonetic Index

Phonetic index 62 is subject to a number of alternative implementations in different embodiments of the invention.

If words in word index 42 are represented by their root forms, they can also be represented by their root forms in phonetic index 62. In such embodiments, for best performance the user is restricted to using root forms in the input question. In other embodiments, in which inflected forms are included in word index 42 and phonetic index 62, the user can use inflected forms as well as root forms, and thus can speak more naturally when posing questions to the invention. In still other embodiments, although words in word index 42 are represented by their root forms, the spoken (though not the spelled) words in phonetic index 62 are represented by both root and inflected forms. Thus the user's inflected speech is mapped into its root forms as it is transcribed. For example, if the root form "rock" appears in word index 42, the pronunciations of the root form "rock" and the inflected forms "rocks," "rocked," "rocking," and so forth can all be stored in association with the spelling ROCK in phonetic index 62. Yet another alternative is to apply phonetic rules to transform inflected spoken words to one or more possible uninflected forms.

More generally, arbitrary spoken pronunciations can be associated with arbitrary written words in phonetic index 62. This means that the spoken language of the invention need not be the same as the written language of the corpus. Phonetic index 62 can, for example, be constructed from translation(s) of word index 42 into foreign languages, to permit multi-lingual access to corpus 41.

The construction of phonetic index 62 from word index 42 can be automated. The pronunciations stored in phonetic index 62 can be created automatically from the orthographic spellings of the words in word index 42 by techniques such as those used for text-to-speech systems. Thus the pronunciations for phonetic index 62 can be constructed automatically for any corpus of text.

In some embodiments, the corpus 41 can be composed of phonetically transcribed text, in which case word index 42 and phonetic index 62 can be identical.

6.2 Smoothing

In some embodiments, if the number of matches found in the phonetic index is low (e.g., significantly less than 30), the hypothesis generator can vary the estimates used in the statistical model of transcriber errors in order to obtain improved results. It can do this, for example, by substituting higher values for substitution/insertion/deletion probabilities in the model by "smoothing" with a uniform distribution. Thereafter, the hypothesis generator re-runs phonetic index matching using the new probabilities.

6.3 Further Query Reformulation Strategies

Additional or alternative strategies for query reformulation can be used in some embodiments. For example, in some embodiments, queries can be reformulated on the basis of the probabilities associated with "corrected" transcriptions. In particular, if low "corrected" transcription probabilities are associated with all candidates for a particular word of the user's utterance, which suggests that the word was garbled or poorly transcribed, the word can be dropped from the query.

6.4 Further Scoring Criteria

Additional or alternative criteria for computing relevance scores for documents can be used in some embodiments. Such criteria can include, for example:

(1) probabilities associated with particular pronunciations in the phonetic index according to speaker-dependent criteria;

(2) probabilities, traditionally computed in IR systems, that take into account the frequency with which the hypothesized words occur in particular documents or in the corpus as a whole;

(3) the number of co-occurrences of two or more words of a hypothesis across several documents, which tends to indicate that these words are semantically related. If in any single document, a particular combination of two or more words of the given hypothesis appear with great frequency, this tends to indicate a coherent set of words that characterize a topic. This word-pair or word-set can be expected to appear in many documents. For example, in documents about President Kennedy, there are likely to be many occurrences of the word "Kennedy" and a smaller number of occurrences of the word "President," and these words will tend to occur in proximity to one another.

6.5 Continuous Speech

In some embodiments the invention accepts continuous speech instead of discrete-word speech. This frees the user to speak more naturally. However, it increases the computational load on the invention, because the invention must maintain multiple hypotheses about word boundary locations. For example, if the user says, "climb a mountain," the invention must determine whether the user has said "climb a mountain" or "climber mountain" or "climb amount ten." It does so by maintaining all these hypotheses in an appropriate data structure such as a word lattice, and then searching for confirming documents in corpus 41 using Boolean/proximity queries that incorporate search terms from the hypotheses. Put another way, whereas in discrete-word embodiments the invention processes a series of relatively short phone sequences, each corresponding to a single word, in continuous-speech embodiments the invention processes all at once the entire phone sequence that is the transcription of the user's utterance, hypothesizing different alternatives for words and word boundary locations and carrying out queries to try to confirm its various hypotheses. To the extent that some word boundaries can be determined without recourse to queries, for example, by noticing pauses in the user's speech or by detecting keywords, this can be incorporated in continuous-speech embodiments to reduce the computation required to disambiguate the user's speech.

7. Embodiment in a Speech Transcription System

Figure 10:
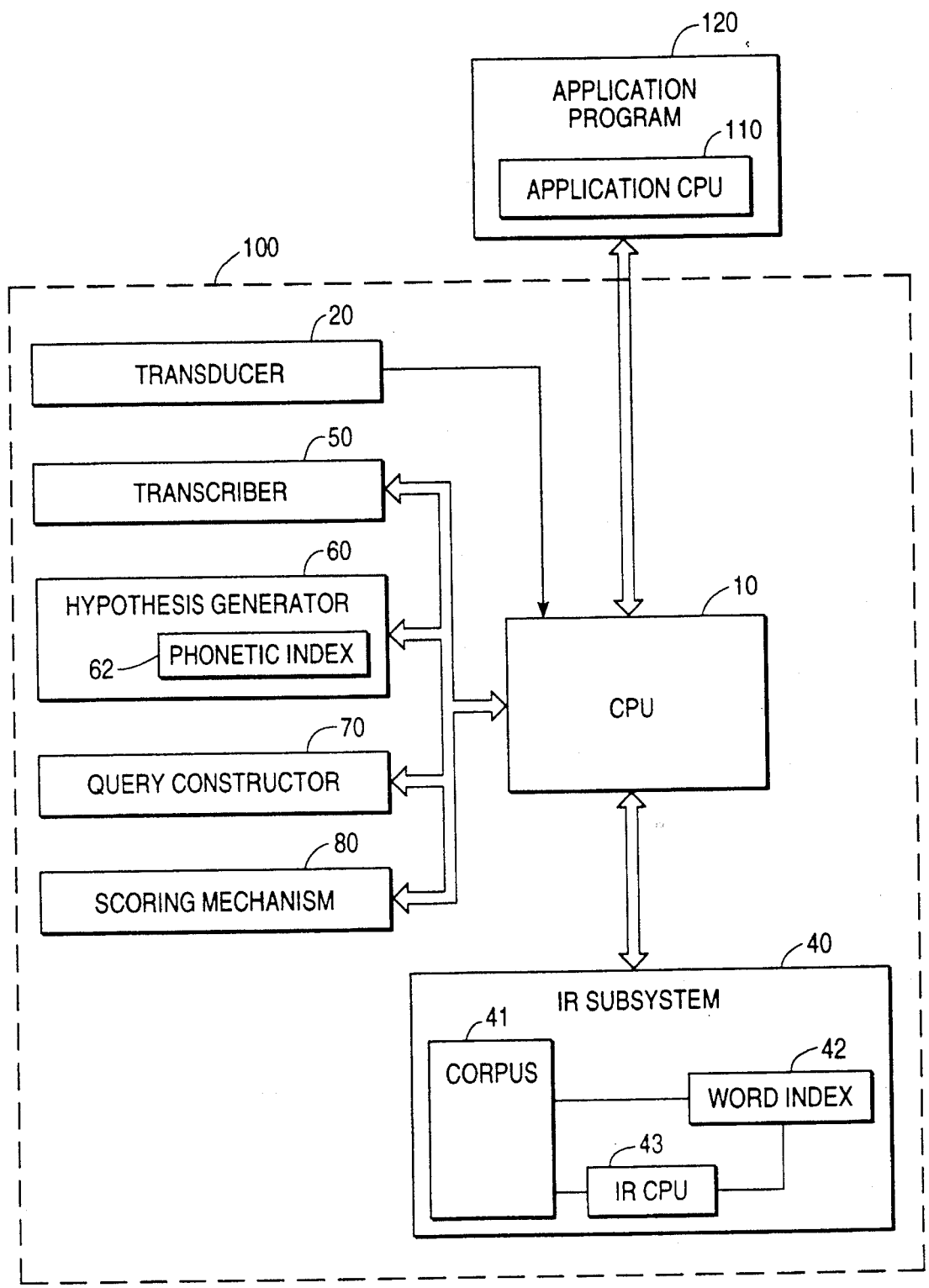
FIG. 10 illustrates a system in which the invention is used as a "front end" speech-recognizer component module in the context of a non-information-retrieval application.

The invention can be used in contexts other than information retrieval. FIG. 10 illustrates the invention used in a general-purpose speech recognizer 100 that serves as a "front end" speech-to-text converter for an application program 120 that accepts text input, such as a word processor. It will be appreciated that the method of the invention can be used as the sole speech-recognition technique of the speech recognizer 100, or as one of a suite of techniques used in combination by speech recognizer 100. Whichever approach is adopted, speech recognizer 100 benefits from a real-world knowledge base in the form of a text corpus or corpora, such as corpus 41. When used in a non-IR context, the documents retrieved by the method of the invention are considered intermediate results that need not be displayed to the user.

The components of speech recognizer 100 are similar to, and similarly numbered to, the components of system 1 of FIG. 1, except that display 30 or speech synthesizer 31 are not provided. Instead, output is fed to application program 120. Application program 120 is executed by its own separate processor 110 in this embodiment; in other embodiments, it can be executed by the same processor 10 that is used in the invention.

In operation, the user's spoken input is transduced into a signal by transducer 20 and then converted into a phone sequence or a set of phone sequences by transcriber 50. If the invention is used as the sole speech recognition technique employed by speech recognizer 100, processing proceeds in a manner similar to that described earlier in the IR context. Specifically, hypothesis generator 60 generates hypotheses that are used as the basis for queries constructed by query constructor 70 and executed using IR subsystem 40 which includes corpus 41. Scoring mechanism 80 determines the best hypothesis (or possibly a set of several best alternative hypotheses) and provides this as output to application program 120. If the invention is used in conjunction with other speech recognition techniques in speech recognizer 100, processing can proceed in the same manner; it is up to application program 120 to combine the interpretations of the user's input utterance provided by the invention and by other techniques. Alternatively, other techniques can be applied first, by routing the signal produced by transducer 20 to other modules (not shown) that incorporate other techniques; portions of the utterance that are not successfully recognized by these other modules are then fed to transcriber 50 and further processed according to the method of the invention.

8. General Applicability of Semantic Co-Occurrence Filtering

Semantic co-occurrence filtering refers to the technique, used in the present invention, in which a sequence of words supplied by a user and transcribed by machine in an error-prone fashion is disambiguated and/or verified by automatically formulating alternative hypotheses about the correct or best interpretation, gathering confirming evidence for these hypotheses by searching a text corpus for occurrences and co-occurrences of hypothesized words, and analyzing the search results to evaluate which hypothesis or hypotheses best represents the user's intended meaning. The documents retrieved in the text corpus search can also be analyzed and evaluated for relevance to the preferred hypothesis or hypotheses in applications where this is appropriate. Semantic co-occurrence filtering is a technique of broad general applicability, as will become-apparent from the embodiment of the invention that will next be described.

Figure 11:
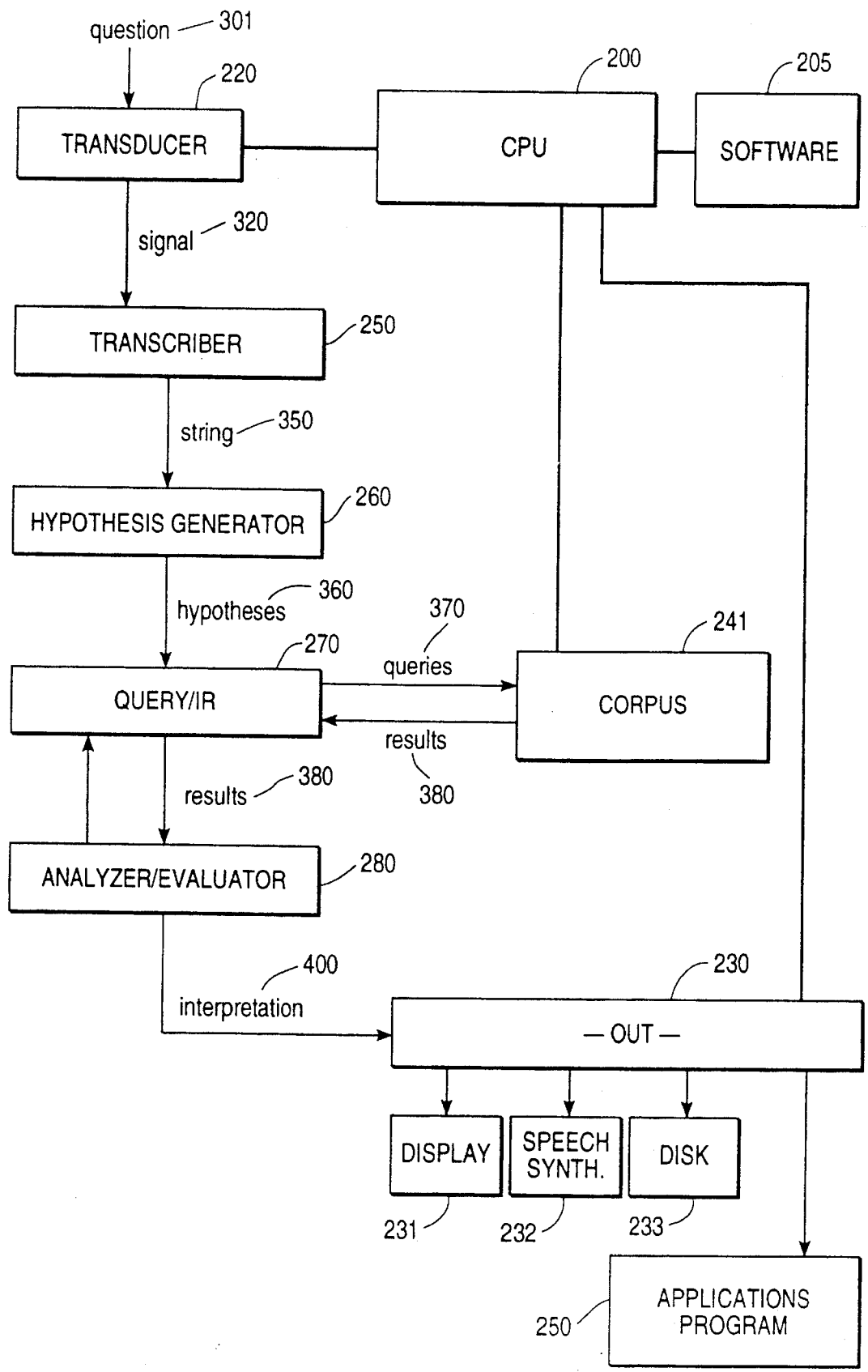
FIG. 11 is a specific embodiment that is adaptable to a range of input sources, hypothesis generation mechanisms, query construction mechanisms, and analysis techniques.

FIG. 11 illustrates a specific embodiment of the invention that is adaptable to a range of input sources, transcription techniques, hypothesis generation techniques, information retrieval techniques, and analysis techniques. The embodiment comprises a processor running appropriate software and coupled to a text corpus, an input transducer, and an output facility such as an output channel, stream, or device.

In brief, the user supplies as input a question, such as a spoken utterance, handwritten phrase, optically scanned document excerpt, or other sequence of words. A transducer converts the input question into a signal suitable for processing by computer. A processor (computer) transcribes the signal into at least one string that comprises a sequence of symbols such as letters, phones, orthographically represented words, or phonetically represented words. Typically the processor's transcription is error-prone, so that the string contains some symbols that do not necessarily correctly represent the user's intended words. Thus there is a need to disambiguate the transcription of the user's question—that is, to determine, insofar as possible, what words the user really intended as input.

The processor generates a set of alternative hypotheses that represent different possible interpretations of what the user meant to say in the question. The hypotheses typically comprise sequences of orthographically represented words; if the text corpus is represented phonetically instead of orthographically, the hypotheses can comprise sequences of phonetically represented words. Alternative hypotheses can be generated in a variety of ways, such as modifying portions of the transcription based on a statistical model of common transcriber errors, consulting a thesaurus, consulting a table of related words, and (if the input question is not delineated into discrete words) positing alternative choices for word boundaries. The processor uses the hypotheses to construct one or more information retrieval queries that are executed over a text corpus. The queries seek hypothesized words in the corpus, and in particular seek co-occurrences of two or more words of a given hypothesis. When two or more words of a hypothesis appear in proximity to one another in a number of documents of the corpus, this is taken as an indication that the words are semantically related and therefore are more likely to represent a correct interpretation of the user's question than semantically unrelated words would. The processor analyzes the query results, which comprise sets of documents returned from the corpus and matched search terms within those documents, to evaluate which hypothesis or hypotheses are most likely to represent a correct interpretation of the user's question, and, in some cases, which documents are most relevant to the preferred hypotheses. Feedback is provided from the analysis component to the query component, so that based on its analysis of the results of a query or queries, the processor can construct reformulated (modified) queries, cause these to be executed, and analyze their results, construct further queries, and so forth until the processor is satisfied with the results or otherwise determines that further queries are not worthwhile. The processor can then output the preferred hypothesis or hypotheses and, if appropriate, the relevant documents for each. Output can be made to a visual display, a speech synthesizer, a storage device, etc., and can also be made to an applications program such as a word processor, desktop publishing program, document analysis program, or other program that accepts textual input.

Referring now more specifically to the elements of FIG. 11, processor 200 executes software 205 and is coupled to input transducer 220, output channel 230, and corpus 241. Transcriber 250, hypothesis generator 260, query/IR mechanism 270, and analyzer/evaluator 280 are typically implemented as software modules that are part of software 205 and are executed by processor 200.

In operation, transducer 220 accepts an input question 301 and converts it into a signal 320. Input question 301 comprises a sequence of words, typically represented in a form convenient for the user but not easily understood by computer. For example, input question 301 can be a spoken utterance, in which case transducer 220 comprises audio signal processing equipment that converts the spoken utterance to signal 320. Input question 301 can be a phrase handwritten with a pen or stylus, in which case transducer 220 comprises a digitizing tablet or input-sensitive display screen as is typical of pen-based computers. Input question 301 can be a document or document excerpt to be optically scanned, in which case transducer 220 comprises an optical scanner with optical character recognition capability. Input question 301 can even be a typewritten character sequence, as when the user is a poor typist, in which case transducer 220 comprises a conventional computer keyboard. Other possible forms of input question 301 and transducer 220 (and indeed, of all elements of the system of FIG. 11) will be apparent to those of skill in the art.

Input question 301 can comprise a sequence of discrete words or a single entity that represents a continuous stream of words. Thus, for example, if input question 301 is handwritten, the user can leave distinct spaces between words to indicate word boundaries, or the handwritten input can be treated as a unit, with the invention determining where word boundaries lie. Input question 301 can in some cases consist of a single word, but preferably comprises two or more words, so that a co-occurrence search can be performed. (It is to be understood that although the user-supplied input 301 is here termed a question, it can be in a form other than a question; for example, it can be a declarative statement, a phrase that is a sentence fragment, or even an entire paragraph or page of text.)

Some or all of the words of input question 301 can be keywords, such as command words or common function words. Keywords are not used in hypotheses or queries, but instead control the actions of the subsequent modules. More particularly, common function words can be ignored on input; they are not incorporated into hypotheses or queries. Command words are also not incorporated into hypotheses or queries, but they can affect the functioning of transcriber 250, hypothesis generator 260, query/IR mechanism 270, or analyzer/evaluator 280.

Transducer 220 provides signal 320 to transcriber 250. Transcriber 250 converts signal 320 to a string 350 that represents a transcription of the input question 301. Typically, transcriber 250 is error-prone, and string 350 does not necessarily represent a correct transcription of what the user intended to say in question 301.

String 350 is a sequence of symbols. If input question 301 comprises discrete words, the symbols of string 350 can be, for example, orthographic (textual) representations of words or phonetic representations of words. If input question 301 comprises a continuous stream of words, the symbols of string 350 can be, for example, letters or phones. Transcriber 250 can optionally provide alternative transcriptions, represented as additional strings in the same format as string 350.

Transcriber 250 provides string 350 and any additional strings representing alternative transcriptions to hypothesis generator 260. Hypothesis generator 260 converts string 350 and any alternatives to a set of hypotheses 360. Typically there is more than one hypothesis in this set. Each hypothesis comprises a sequence of words, typically represented by their orthographic spellings. (It is also possible for the words to be represented phonetically; this will be the case if corpus 241 comprises documents in which words are represented phonetically rather than as written text.) Each hypothesis comprises a sequence of candidates, which are possible interpretations of each of the user's words. If input question 301 is presented as discrete words, then word boundaries are the same for all hypotheses, so that different hypotheses can be generated simply by interchanging candidates. If input question 301 is presented as a continuous stream, then word boundaries can differ for different hypotheses.

In producing the hypotheses 360, hypothesis generator 260 can make use of any alternative transcriptions produced by transcriber 250 and can also generate additional possible interpretations of the words of the user's question 301. Conversion of string 350 and any alternatives to hypotheses 360 can be done according to a wide variety of techniques, used alone or in combination. For example, if string 350 is a sequence of phones or a sequence of phonetically represented words, phonetic substitutions, insertions, and deletions according to a model of transcriber performance and errors, can be used in conjunction with phonetic index matching as described earlier with reference to FIGS. 2, 4, and 5. Additionally, a table of homonyms can be incorporated. If string 350 is a sequence of orthographic words, a spelling dictionary can be used. Additionally, a thesaurus, or a table of related words (e.g., for spoken input, a table of words with related sounds), can be used to generate more search terms. Although such related words do not appear explicitly in question 301, their presence in corpus 241 in conjunction with other words of question 301 and related words will tend to confirm particular hypothesized interpretations of question 301.

Hypothesis generator 260 provides hypotheses 360 to query/IR mechanism 270. Query/IR mechanism 270 converts the hypotheses 360 to one or more information retrieval queries 370. Any of a number of information retrieval query techniques can be used, such as Boolean queries with proximity and order constraints or extended Boolean queries. Whatever technique is used, the queries 370 are in a format that can be searched by processor 200 (or a separate IR processor that communicates with processor 200) using corpus 241. Typically, a query searches for the co-occurrence of two or more candidate words from a hypothesis or hypotheses. If a hypothesis consists of a single word, then a query can search for that word alone.

If input question 301 is provided in discrete-word form, so that the candidates for any given word of input question 301 all share the same word boundaries, then many hypotheses can be combined to construct a single query. For example, if question 301 is the handwritten phrase "president kennedy," and it is known that this phrase contains two words (as indicated by the blank space between them), then if Boolean/proximity queries are used, a query such as

| (k | {president present prescient . . . } {kennedy canada . . . }) |
|---|---| can be constructed. This query seeks the co-occurrence within k words of any candidate for the first word of question 301 and any candidate for the second word of question 301. Each search term of the query is a Boolean OR of all candidates for a particular word of the query.

In contrast, if input question 301 is provided as a continuous stream of words, so that hypothesis generator 260 can entertain multiple possibilities for word boundaries, then it may not be possible to combine hypotheses in a single query. For example, if question 301 is the handwritten phrase "presidentkennedy," with no blank spaces, then if Boolean/proximity queries are used, queries such as (k {preside precede} {other either} {unity remedy})

and

| | (k | {preside precede} {other either} {unity remedy}) |
|---|---|---|
| and | | |
| | (k | {president present prescient . . . } {kennedy canada . . . }) | can be executed independently of one another. Alternatively, several of these queries can be represented together, for example as regular expressions.

Queries 370 are executed by query/IR mechanism 370 over corpus 241. The actual search of corpus 241 can be done by processor 200 or by a separate subsystem comprising one or more separate IR processors. Results 380 are returned as a consequence of executing queries 370.

Query/IR mechanism 370 provides results 380 to analyzer/evaluator 280. Analyzer/evaluator 280 analyzes results 380 to determine which of the hypothesis or hypotheses 360 is most likely to represent a correct interpretation of question 301. Additionally, if appropriate to the particular application of the invention, analyzer/evaluator 280 determines which retrieved documents are most relevant to the preferred hypothesis or hypotheses. Analyzer/evaluator 280 can provide feedback to query/IR mechanism 270, to request that reformulated queries be executed, for example to obtain a broader or narrower range of results.

Analyzer/evaluator 280 can employ a variety of analysis strategies to implement semantic co-occurrence filtering. Some examples are the heuristic strategies described earlier with reference to FIGS. 2 and 7. Strategies can also, for example, make use of synonyms generated by a thesaurus incorporated into hypothesis generator 260. Whatever strategies are used, they have in common that the co-occurrence of two or more candidate words of a given hypothesis—that is, the appearance of two candidate words of a hypothesis in proximity to one another in one or more documents of corpus 241—is taken as evidence tending to confirm both the candidate words and the hypothesis, and can further be taken as evidence that the document in which the candidate words appear is relevant to input question 301.

Analyzer/evaluator 280 provides the hypothesis or hypotheses most likely to correctly interpret question 301 and, if appropriate, query results relevant to this hypothesis or hypotheses, as an interpretation 400 that is output via output channel 230. The hypotheses can be represented, for example, as ASCII text. The query results can include, for example, documents in excerpt or full-text form, document titles, and matched search terms.

Output channel 230 can send interpretation 400 to be displayed using a visual display 231, spoken to the user by a speech synthesizer 232, or stored using a storage device such as a hard disk 233. Additionally or instead, output channel 320 can send interpretation 400 to an applications program 250 to be used as input thereby.

If the appropriate command keywords are supported, the user can provide relevance feedback based on displayed or speech-synthesized output. In this case, interpretation 400 can be used as a "mini-corpus" to facilitate the understanding of the inputs that the user provides as relevance feedback.

9. Operational Example

The following example illustrates an output trace from a testbed embodiment of the invention that simulates a speech-recognizing IR application. An on-line version of Grolier's Academic American Encyclopedia (*The Academic American Encyclopedia,* Danbury, Conn.: Grolier Electronic Publishing, 1990) serves as the text corpus for this embodiment. The on-line encyclopedia contains approximately 27,000 articles, which are accessed via the Text Database (D. R. Cutting, J. Pedersen, and P. -K. Halvorsen, "An object-oriented architecture for text retrieval," in *Conference Proceedings of RIAO '91, Intelligent Text and Image Handling,* Barcelona, Spain, April 1991, pages 285–298), which is a flexible platform for the development of retrieval system prototypes and is structured so that additional functional components can be easily integrated. The phonetic index is constructed by merging the contents of a 23,000 word phonetic dictionary with Grolier's encyclopedia, to produce a phonetic index that covers 16,000 of the total 100,000 words in the Grolier word index.

The hardware for the testbed embodiment comprises a Sun SparcStation 10 workstation. The testbed embodiment of the invention has no transducer or transcriber components, and the user does not actually speak the words of the input question. Instead, the embodiment accepts input in the form of a simulated errorful phonetic transcription of the user's words, which is created manually from a confusion matrix. The simulated transcription assumes discrete-word speech.

The testbed embodiment of the invention does not do query reformulation. The initial query is the only query; no additional or modified queries are constructed or executed in this embodiment.

For the example below, the user's utterance consists of the spoken words "first", "atomic" and "bomb." For each spoken word, the words in the phonetic index that match a simulated errorful transcription are shown. The form of an IR query is then presented, followed by a list of matching documents, in alphabetical title order. The entries marked with triple asterisks '***' indicate extra documents that are not present if an IR query is made from a perfect phonetic transcription: (5 first atomic bomb).

| Phonetic index entries that match a noisy version of the word "first": (total of 19 entries) | | | |
|---|---|---|---|
| fez: | (F EH Z) | fierce: | (F IH2 R S) |
| fife: | (F AY F) | first: | (F ER2 S SIL2-T) |
| firth: | (F ER2 TH) | fish: | (F IH2 SH2) |
| fist: | (F IH2 S SIL2-T) | fizz: | (F IH2 Z) |
| frizz: | (F R IH2 Z) | frost: | (F R AO2 S SIL2-T) |
| froth: | (F R AO2 TH) | furze: | (F ER2 Z) |
| fuss: | (F AH2 S) | fuzz: | (F AH2 Z) |
| phiz: | (F IH2 Z) | theft: | (TH EH F SIL2-T) |
| thirst: | (TH ER2 S SIL2-T) | thrice: | (TH RAY S) |
| thrift: | (TH R IH2 F SIL2-T) | | |

| Phonetic index entries that match a noisy version of the word "atomic": (total of 41 entries) | | | |
|---|---|---|---|
| acid: | (AE S IH2 SIL2-D) | adage: | (AE SIL2-D IH2 JH) |
| adduce: | (AH2 SIL2-D UW2 S) | adjudge: | (AH2 JH AH2 JH) |
| admit: | (AH2 SIL2-D M2 IH2 SIL2-T) | apace: | (AH2 SIL2-P EY S) |
| apart: | (AH2 SIL2-P AO2 R SIL2-T) | apeak: | (AH2 SIL2-P IY SIL2-K) |
| apiece: | (AH2 SIL2-P IY S) | aport: | (AH2 SIL2-P OW R SIL2-T) |
| appanage: | (AE SIL2-P AH2 N2 IH2 JH) | apse: | (AE SIL2-P S) |
| apt: | (AE SIL2-P SIL2-T) | aside: | (AH2 S AY SIL2-D) |
| ask: | (AE S SIL2-K) | asp: | (AE S SIL2-P) |
| assert: | (AH2 S ER2 SIL2-T) | assess: | (AH2 S EH S) |
| asset: | (AE S EH SIL2-T) | assort: | (AH2 S AO2 R SIL2-T) |
| assuage: | (AH2 S W EY JH) | atomic: | (AH2 SIL2-T AO2 M2 IH2 SIL2-K) |
| atop: | (AH2 SIL2-T AO2 SIL2-P) | attack: | (AH2 SIL2-T AE SIL2-K) |
| attic: | (AE SIL2-T IH2 SIL2-K) | audit: | (AO2 SIL2-D IH2 SIL2-T) |
| automate: | (AO2 SIL2-T AH2 M2 EY SIL2-T) | edit: | (EH SIL2-D IH2 SIL2-T) |
| educe: | (IH2 SIL2-D UW2 S) | epic: | (EH SIL2-P IH2 SIL2-K) |

| | | | |
|---|---|---|---|
| epoch: | (EH SIL2-P AH2 SIL2-K) | erst: | (ER2 S SIL2-T) |
| essence: | (EH S N2 S) | isthmus: | (IH2 S M2 AH2 S) |
| its | on stop list--ignored | opaque: | (OW SIL2-P EY SIL2-K) |
| opt: | (AO2 SIL2-P SIL2-T) | opus: | (OW SIL2-P AH2 S) |
| oust: | (AW S SIL2-T) | outward: | (AW SIL2-T W ER2 SIL2-D) |
| outwork: | (AW SIL2-T W ER2 SIL2-K) | upward: | (AH2 SIL2-P W ER2 SIL2-D) |

Phonetic index entries that match a noisy version of the word "bomb":
(total of 44 entries)

| | | | |
|---|---|---|---|
| a: | on stop list--ignored | | |
| awe: | (AO2) | awn: | (AO2 N2) |
| ay: | (AY) | ayah: | (AY AH2) |
| aye: | (AY) | balm: | (SIL2-B AO2 M2) |
| beau: | (SIL2-B OW) | boa: | (SIL2-B OW AH2) |
| bob: | (SIL2-B AO2 SIL2-B) | bomb: | (SIL2-B AO2 M2) |
| bone: | (SIL2-B OW N2) | bough: | (SIL2-B AW) |
| bow: | (SIL2-B OW) | bum: | (SIL2-B AH2 M2) |
| bump: | (SIL2-B AH2 M2 SIL2-P) | bun: | (SIL2-BB AH2 N2) |
| bung: | (SIL2-B AH2 NG2) | buy: | (SIL2-B AY) |
| by: | on stop list--ignored | bye: | (SIL2-B AY) |
| eye: | (AY) | i: | (AY) |
| o: | (OW) | ohm: | (OW M2) |
| on: | on stop list--ignored | ope: | (OW SIL2-P) |
| owe: | (OW) | own: | (OW N2) |
| pa: | (SIL2-P AO2) | palm: | (SIL2-P AO2 M2) |
| pas: | (SIL2-P AO2) | paw: | (SIL2-P AO2) |
| pawn: | (SIL2-P AO2 N2) | pi: | (SIL2-P AY) |
| pie: | (SIL2-P AY) | pine: | (SIL2-P AY N2) |
| pipe: | (SIL2-P AY SIL2-P) | pomp: | (SIL2-P AO2 M2 SIL2-P) |
| pone: | (SIL2-P OW N2) | pop: | (SIL2-P AO2 SIL2-P) |
| pope: | (SIL2-P OW SIL2-P) | pub: | (SIL2-P AH2 SIL2-B) |
| pump: | (SIL2-P AH2 M2 SIL2-P) | pun: | (SIL2-P AH2 N2) |
| pup: | (SIL2-P AH2 SIL2-P) | up: | (AH2 SIL2-P) |

IR Query: (5  {fez fierce . . . first . . . thrice thrift}
   {acid adage . . . atomic . . . outwork upward}
   {awe awn ay . . . bomb . . . pun pup up})

DISCUSSION OF THE SOFTWARE

A current embodiment of the invention is implemented in software on a digital computer. The appendix (unpublished work, Copyright ©1993 Xerox Corporation) provides source code for a software program for implementation of this embodiment. The source code is written in the Lisp language (Franz Allegro Common Lisp version 4.1), well known to those of skill in the art. The software program has been demonstrated on a Sun SparcStation 10 workstation, although it will be apparent to those of skill in the art that a wide variety of programming languages and hardware configurations can readily be used based on this disclosure without departing from the scope of the invention.

The Appendix includes two files. The first file includes source code for reading a phonetic index file, for query construction, and for scoring. The second file includes source code for hypothesis generation.

The two source code files provided in the Appendix are designed to be used in conjunction with certain additional software modules. An on-line version of Grolier's Academic American Encyclopedia (*The Academic American Encyclopedia*, Danbury, Conn.: Grolier Electronic Publishing, 1990), serves as the text corpus. Encyclopedia articles are accessed via the Text Database (D. R. Cutting, J. Pedersen, and P. -K. Halvorsen, "An object-oriented architecture for text retrieval," in *Conference Proceedings of RIAO '91, Intelligent Text and Image Handling*, Barcelona, Spain, April 1991, pages 285–298), a flexible platform for the development of retrieval system prototypes. The phonetic index is constructed by merging the contents of a phonetic dictionary (the Moby Pronunciator II, distributed by Grady Ward, Arcata, Calif.) with Grolier's encyclopedia. In the phonetic index, orthographic spellings are stored in a vector, and phone sequences are represented by a finite-state network that provides an index into the vector. This technique is substantially similar to the minimal perfect hashing technique described in Lucchesi, Claudio L. and Tomasz Kowaltowski, "Applications of Finite Automata Representing Large Vocabularies," *Software—Practice and Experience*, vol. 23(1), pp. 15–30, January 1993 (see especially pp. 26–27). Discrete-word speech can be input using a Sennheiser HMD414 headset microphone and a Rane MS-1 preamplifier, with signal processing performed in software by the SparcStation. Input speech is transcribed into a phone sequence using hidden Markov model methods, a discussion of which can be found in Lawrence R. Rabiner, "A Tutorial on Hidden Markov Models and Selected Applications in Speech Recognition," *Proceedings of the IEEE*, vol. 77, no. 2, Feb. 1989, pp. 257–285. An alignment program is used to compare the phonetic transcription with phone sequences of the phonetic index. Alternatively, a simulated errorful phonetic transcription of the user's words can be created manually from a confusion matrix and provided in lieu of actual speech input, transcription, and alignment.

CONCLUSION

The present invention provides a system and method for disambiguating words in the output of a transcriber based on the co-occurrence of words in a text corpus. The invention uses the likelihood of co-occurrence of words in the corpus to filter or constrain the candidate hypotheses. The invention takes advantage of the observations that the user's input questions most often comprise semantically related words, that documents of the corpus do likewise, that words that co-occur in a user question are likely to co-occur with some regularity in the documents of the corpus, and that words that are the product of transcription errors tend not to be semantically related and therefore tend not to co-occur in documents of the corpus. Boolean IR queries are used to disambiguate the words of the user's question and, in embodiments where information retrieval is the primary application, simultaneously to retrieve relevant documents from the corpus.

The invention has been explained with reference to specific embodiments. Other embodiments are contemplated without departing from the spirit and scope of the invention. For example, in some embodiments, syntactic or semantic analysis (e.g., noun-phrase recognition) can be used in analyzing documents returned in response to queries (e.g., IR query matches to words of a given hypothesis can be assigned relatively higher scores if the matched words appear in the retrieved document in a noun phrase structure that corresponds to a noun phrase structure in the hypothesis). As another example, in other embodiments hypotheses can be ranked initially according to relatively inaccurate but computationally efficient ("coarse") criteria, and then a subset of these ranked further according to relatively accurate but computationally inefficient ("fine") criteria. It is therefore not intended that this invention be limited, except as indicated by the appended claims.

What is claimed is:

1. An automated transcription disambiguation method comprising the steps of:

provinding an input question having first and second words to a processor in a form subject to misinterpretation by the processor;

generating a plurality of hypotheses with the processor, the hypotheses including alternative interpretations of at least one of the first and second words due to possible misinterpretations of the input question by the processor;

producing with the processor an initial evaluation of the hypotheses;

gathering confirming evidence for the hypotheses by searching with the processor in a text corpus for co-occurrences of hypothesized first and second words for the hypotheses;

automatically and explicitly selecting with the processor from among the plurality of hypotheses a preferred hypothesis as to both of the first and second words based at least in part on the initial evaluation and at least in part on the gathered confirming evidence; and outputting a transcription result from the processor, the transcription result representing the selected preferred hypothesis.

2. In the operation of a system comprising a processor, an input transducer, an output facility, and a corpus comprising at least one document comprising words represented in a first form, a method for transcribing an input question by transforming the input question from a sequence of words represented in a second form, subject to misinterpretation by the processor, into a sequence of words represented in the first form, the method comprising the steps of:

accepting the input question into the system, the question comprising a sequence of words represented in the second form;

converting the input question into a signal with the input transducer;

converting the signal into a sequence of symbols with the processor;

generating a set of hypotheses from the sequence of symbols with the processor, the hypotheses of the set comprising sequences of words represented in the first form, the set of hypotheses including alternative interpretations of at least one of the words to account for possible misinterpretation of the input question;

producing with the processor an initial evaluation of the hypotheses;

automatically constructing a query from hypotheses of the set with the processor;

executing the constructed query by searching with the processor in the corpus for co-occurrences of hypothesized words for the hypotheses;

analyzing the co-occurrences and the initial evaluation with the processor to produce a revised evaluation of the hypotheses of the set;

automatically and explicitly selecting a preferred hypothesis from the set with the processor responsively to the revised evaluation, the preferred hypothesis comprising a preferred sequence of words in the first form and thus a preferred transcription of the sequence of words of the input question; and outputting the preferred hypothesis with the output facility.

3. The method of claim 2 wherein:

the corpus includes a plurality of documents;

the step of executing the constructed query includes retrieving documents containing the co-occurrences;

the step of automatically and explicitly selecting the preferred hypothesis further comprises selecting with the processor a preferred set of documents, the preferred set of documents comprising a subset of the retrieved documents that are relevant to the preferred hypothesis, and the step of outputting the preferred hypothesis further comprises outputting with the output facility at least a portion of a document belonging to the preferred set of documents.

4. The method of claim 3 further comprising the steps, performed after the step of outputting at least a portion of a document belonging to the preferred set of documents, of:

accepting a relevance feedback input into the system, the relevance feedback input comprising a sequence of words represented in the second form, the sequence of words including a relevance feedback keyword and a word that occurs in the outputted document;

converting the relevance feedback input into an additional query with the processor; and executing the additional query with the processor to retrieve an additional document from the corpus.

5. The method of claim 2 wherein:

the step of automatically and explicitly selecting the preferred hypothesis further comprises selecting a plurality of preferred hypotheses with the processor; and the step of outputting the preferred hypothesis further comprises outputting the selected plurality of preferred hypotheses with the output facility.

6. The method of claim 2 wherein:

the step of accepting an input question further comprises accepting information into the system, the information concerning the locations of word boundaries between words of the question; and the step of converting the signal into a sequence of symbols further comprises specifying subsequences of the sequence of symbols with the processor according to the locations of word boundaries thus accepted.

7. The method of claim 2 wherein the step of generating a set of hypotheses from the sequence of symbols further comprises generating hypothesized locations of word boundaries with the processor.

8. The method of claim 2 wherein the step of converting the input question into a signal comprises converting spoken input into an audio signal with an audio transducer.

9. The method of claim 2 wherein the step of constructing a query from hypotheses of the set comprises constructing a Boolean query with a proximity constraint.

10. The method of claim 2 wherein the step of generating a set of hypotheses from the sequence of symbols comprises detecting a keyword with the processor to prevent inclusion of the keyword in hypotheses of the set.

11. The method of claim 10 wherein the step of constructing a query from hypotheses of the set comprises constructing a query from hypotheses of the set with the processor, the query being responsive to the detected keyword.

12. The method of claim 2 wherein the step of constructing a query from hypotheses of the set comprises constructing an initial query with the processor and prior to the outputting step automatically constructing a reformulated query with the processor, the reformulated query comprising a reformulation of the initial query.

13. The method of claim 2 wherein the step of outputting the preferred hypothesis comprises visually displaying the preferred hypothesis.

14. The method of claim 2 wherein the step of outputting the preferred hypothesis comprises synthesizing a spoken form of the preferred hypothesis.

15. The method of claim 2 wherein the step of outputting the preferred hypothesis comprises providing the preferred hypothesis to an applications program.

16. The method of claim 15 further comprising the step of accepting the preferred hypothesis into the applications program as textual input to the applications program.

17. The method of claim 2 wherein the step of producing an initial evaluation comprises determining an initial evaluation measurement for each hypothesis.

18. In a system comprising a processor, a method for processing an input utterance comprising speech, the method comprising the steps of:

accepting the input utterance into the system;

producing a phonetic transcription of the input utterance with the processor;

responsively to the phonetic transcription, generating with the processor a set of hypotheses, the hypotheses of the set being hypotheses as to a first word contained in the input utterance and further as to a second word contained in the input utterance, the set of hypotheses including alternative interpretations of at least one of the words to account for the error-prone nature of speech analysis;

determining with the processor an initial evaluation measurement for each hypothesis;

automatically constructing an information retrieval query with the processor, the query comprising the set of hypotheses and a proximity constraint;

executing the constructed query in conjunction with an information retrieval subsystem comprising a text corpus; and responsively to the results of the executed query with respect to each hypothesis of the set of hypotheses, and taking into consideration the initial evaluation measurements of the hypotheses, automatically and explicitly selecting with the processor from among the hypotheses of the set a preferred hypothesis, the preferred hypothesis including the first and second words.

19. The method of claim 18 wherein the step of generating a set of hypotheses comprises matching portions of the phonetic transcription against a phonetic index with the processor.

20. In a system comprising a processor, an error-prone input facility, and an information retrieval subsystem, said information retrieval subsystem comprising a natural-language text corpus, a method for accessing documents of the corpus, the method comprising the steps of:

transcribing a question with the error-prone input facility and the processor, the question comprising a sequence of words;

selecting a subset of words of the sequence with the processor;

forming with the processor a plurality of hypotheses about the selected subset of words, the hypotheses of the plurality representing possible alternative transcriptions of the question to account for the error-prone nature of the input facility;

producing with the processor an initial evaluation of the hypotheses;

automatically constructing a co-occurrence query with the processor, the co-occurrence query being based on hypotheses of the plurality;

executing the co-occurrence query in conjunction with the information retrieval subsystem to retrieve a set of documents;

analyzing the initial evaluation and documents of the retrieved set with the processor to produce a revised evaluation of the hypotheses;

responsively to the revised evaluation, automatically and explicitly selecting with the processor a preferred hypothesis representing a preferred transcription of the sequence of words of the question;

evaluating documents of the retrieved set with the processor with respect to the selected hypothesis to determine a relevant document; and outputting from the system the relevant document thus determined.

21. An automated system for producing a preferred transcription of a question presented in a form prone to erroneous transcription, comprising:

a processor;

an input transducer, coupled to the processor, for accepting an input question and producing a signal therefrom;

converter means, coupled to the input transducer, for converting the signal to a string comprising a sequence of symbols;

hypothesis generation means, coupled to the converter means, for developing a set of hypotheses from the string, each hypothesis of the set comprising a sequence of word representations, the set of hypotheses representing a set of possible alternative transcriptions of the input question to account for the likelihood of erroneous transcription;

initial scoring means, coupled to the hypothesis generation means, for determining an initial score for each hypothesis;

query construction means, coupled to the hypothesis generation means, for automatically constructing at least one information retrieval query using hypotheses of the set;

a corpus comprising documents, each document comprising word representations;

query execution means, coupled to the query construction means and to the corpus, for retrieving from the corpus documents responsive to said at least one query;

analysis means, coupled to the query execution means, for generating an analysis of the retrieved documents and evaluating the hypotheses of the set based on the initial scores and the analysis to determine a preferred hypothesis from among the hypotheses of the set, the preferred hypothesis representing a preferred transcription of the sequence of words of the input question; and output means, coupled to the analysis means, for outputting the preferred hypothesis.

22. A speech processing apparatus comprising:

input means for transducing a spoken utterance into an audio signal;

means for converting the audio signal into a sequence of phones;

means for analyzing the sequence of phones to generate a plurality of hypotheses comprising sequences of words, the hypotheses representing possible alternative transcriptions of the spoken utterance to account for the error-prone nature of speech analysis;

means for determining an initial evaluation measurement for each hypothesis;

means for automatically constructing a query using the hypotheses of the plurality;

information retrieval means, coupled to a corpus of documents and to the constructing means, for retrieving documents of the corpus relevant to the constructed query;

means for automatically and explicitly ranking the hypotheses of the plurality according to confirming evidence found in the retrieved documents and further according to the initial evaluation measurements previously determined; and means for outputting a subset of the hypotheses thus ranked, each hypothesis of the subset comprising a sequence of words representing a possible transcription of the spoken utterance.

* * * * *